US008530828B2

(12) United States Patent
Ivosev et al.

(10) Patent No.: US 8,530,828 B2
(45) Date of Patent: Sep. 10, 2013

(54) SYSTEMS AND METHODS FOR REDUCING NOISE FROM MASS SPECTRA

(75) Inventors: Gordana Ivosev, Etobicoke (CA); Ronald Bonner, Newmarket (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

(21) Appl. No.: 13/437,837

(22) Filed: Apr. 2, 2012

(65) Prior Publication Data

US 2013/0087701 A1 Apr. 11, 2013

Related U.S. Application Data

(63) Continuation-in-part of application No. 12/626,737, filed on Nov. 27, 2009, now Pat. No. 8,148,678, which is a continuation of application No. 12/023,873, filed on Jan. 31, 2008, now Pat. No. 7,638,764.

(60) Provisional application No. 60/887,915, filed on Feb. 2, 2007.

(51) Int. Cl.

| | |
|---|---|
| ***H01J 49/26*** | (2006.01) |
| ***B01D 59/44*** | (2006.01) |
| ***H04B 15/00*** | (2006.01) |
| ***G06F 17/00*** | (2006.01) |

(52) U.S. Cl.
USPC ............. 250/281; 250/282; 250/288; 702/17; 702/190; 702/191; 436/173

(58) Field of Classification Search
USPC .................. 250/281, 282, 288, 287; 702/17, 702/190, 191; 436/173
See application file for complete search history.

(56) References Cited

U.S. PATENT DOCUMENTS

| | | | | |
|---|---|---|---|---|
| 7,638,764 | B2 * | 12/2009 | Ivosev | 250/282 |
| 7,865,322 | B2 * | 1/2011 | Ivosev et al. | 702/69 |
| 8,026,479 | B2 * | 9/2011 | Lock et al. | 250/288 |
| 8,148,678 | B2 * | 4/2012 | Ivosev | 250/282 |
| 8,180,581 | B2 * | 5/2012 | Ivosev et al. | 702/32 |
| 2003/0036207 | A1 * | 2/2003 | Washburn et al. | 436/518 |
| 2011/0315870 | A1 * | 12/2011 | Lock et al. | 250/282 |

* cited by examiner

*Primary Examiner* — Nikita Wells
(74) *Attorney, Agent, or Firm* — John R. Kasha; Kelly L. Kasha; Kasha Law LLC

(57) ABSTRACT

A plurality of scans of a sample are performed, producing a plurality of mass spectra. Neighboring mass spectra of the plurality of mass spectra are combined into a collection of mass spectra based on sample location, time, or mass. A background noise estimate is calculated for the collection of mass spectra. The collection of mass spectra is filtered using the background noise estimate, producing a filtered collection of one or more mass spectra. Quantitative or qualitative analysis is performed using the filtered collection of one or more mass spectra. The background noise estimate is calculated by dividing the collection of mass spectra into two or more windows, for example. For each window of the two or more windows, all spectra within each window are combined, producing a combined spectrum for each of the two or more windows. For each combined spectrum, a background noise is estimated.

23 Claims, 23 Drawing Sheets

52'

61

74

76

92

99

102

104

1400

SYSTEMS AND METHODS FOR REDUCING NOISE FROM MASS SPECTRA

CROSS REFERENCE TO RELATED APPLICATION

This application is a continuation-in-part application of U.S. patent application Ser. No. 12/626,737, filed Nov. 27, 2009, now U.S. Pat. No. 8,148,678, which is a continuation application of U.S. patent application Ser. No. 12/023,873, filed Jan. 31, 2008, now U.S. Pat. No. 7,638,764, that claims priority to U.S. Provisional Patent Application No. 60/887,915 filed on Feb. 2, 2007, and this application claims priority to U.S. Provisional Patent Application No. 61/582,304 filed on Dec. 31, 2011. All of the above mentioned applications are incorporated by reference herein in their entireties.

INTRODUCTION

Periodic noise in mass spectrometry (presumably arising from clusters of ions and neutral molecules) is normally associated with very low flow rate electrospray ionization (ESI) (e.g., nanospray) and matrix-assisted laser desorption/ionization (MALDI). This noise is generally characterized by equally spaced peaks across a large mass range. The peaks have similar intensity, which may decrease with increasing mass, and are generally broader than expected for the given instrument and mass, suggesting the presence of unresolved components.

Periodic noise has been observed in data from separation coupled mass spectrometry. This noise affects both qualitative and quantitative measurements performed from this data. As a result, the removal of period noise from separation coupled mass spectrometry is desirable.

BRIEF DESCRIPTION OF THE DRAWINGS

The skilled artisan will understand that the drawings, described below, are for illustration purposes only. The drawings are not intended to limit the scope of the present teachings in any way.

Figure 1:
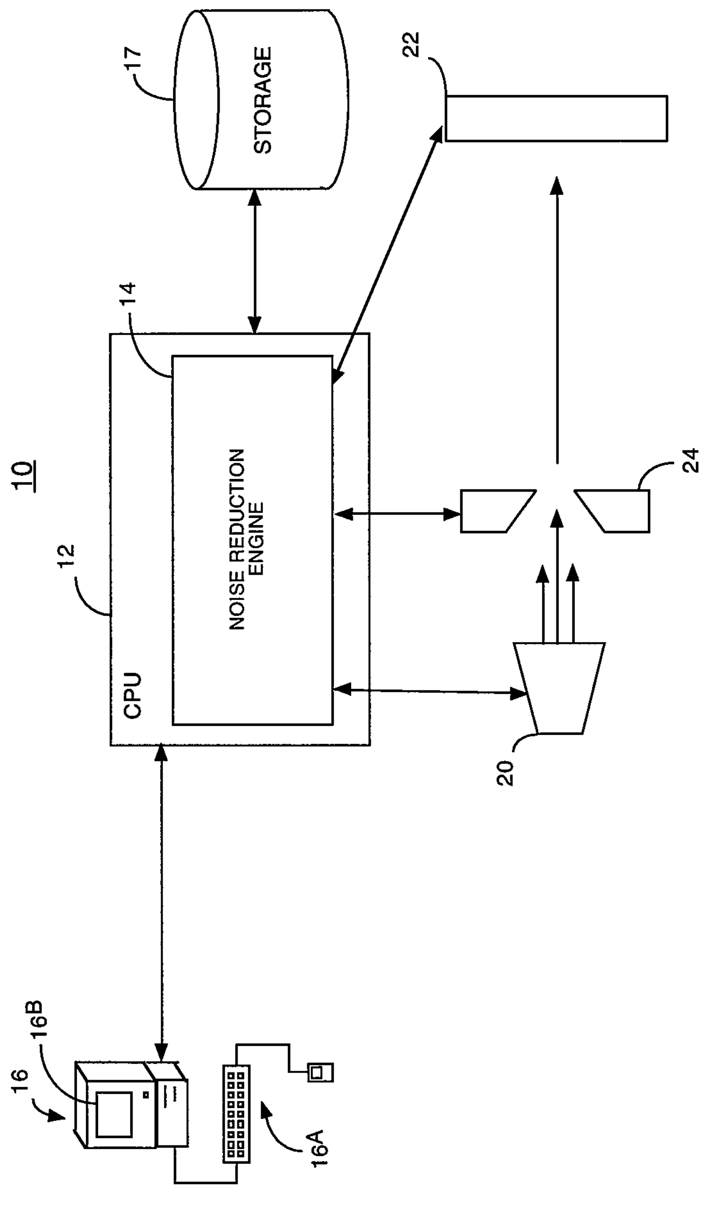
FIG. 1 is a schematic diagram of a noise reducing system made in accordance with the present invention.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Periodic Noise in Separation Coupled Mass Spectrometry

Referring to FIG. 1, illustrated therein is a noise reducing system, referred to generally as 10, made in accordance with the present invention. The system 10 comprises a processor or central processing unit (CPU) 12 having a suitably programmed noise reduction engine 14. The programming for the engine 14 may also be saved on storage media for example such as a computer disc or CD-ROM. An input/output (I/O) device 16 (typically including a data input component 16.sup.A, and an output component such as a display 16.sup.B) is also operatively coupled to the CPU 12. As will be understood, preferably the data input component 16.sup.A will be configured to receive mass spectrum and/or frequency domain data, and the display 16.sup.B will similarly be configured to graphs corresponding to mass spectra and frequency domains.

Data storage 17 is also preferably provided in which may be stored mass spectrum and frequency domain data.

As will be understood, the system 10 may be a stand-alone analysis system for reducing noise in a mass spectrum (or frequency domain data). In the alternative, the system 10 may (but does not necessarily have to) comprise part of a spectrometer system having an ion source 20, configured to emit a beam of ions, generated from a sample to be analyzed.

A detector 22 (having one or more anodes or channels) may also be provided as part of the spectrometer system, which can be positioned downstream of the ion source 20, in the path of the emitted ions. Optics 24 or other focusing elements, such as an electrostatic lens can also be disposed in the path of the emitted ions, between the ion source 20 and the detector 22, for focusing the ions onto the detector 22.

Figure 2:
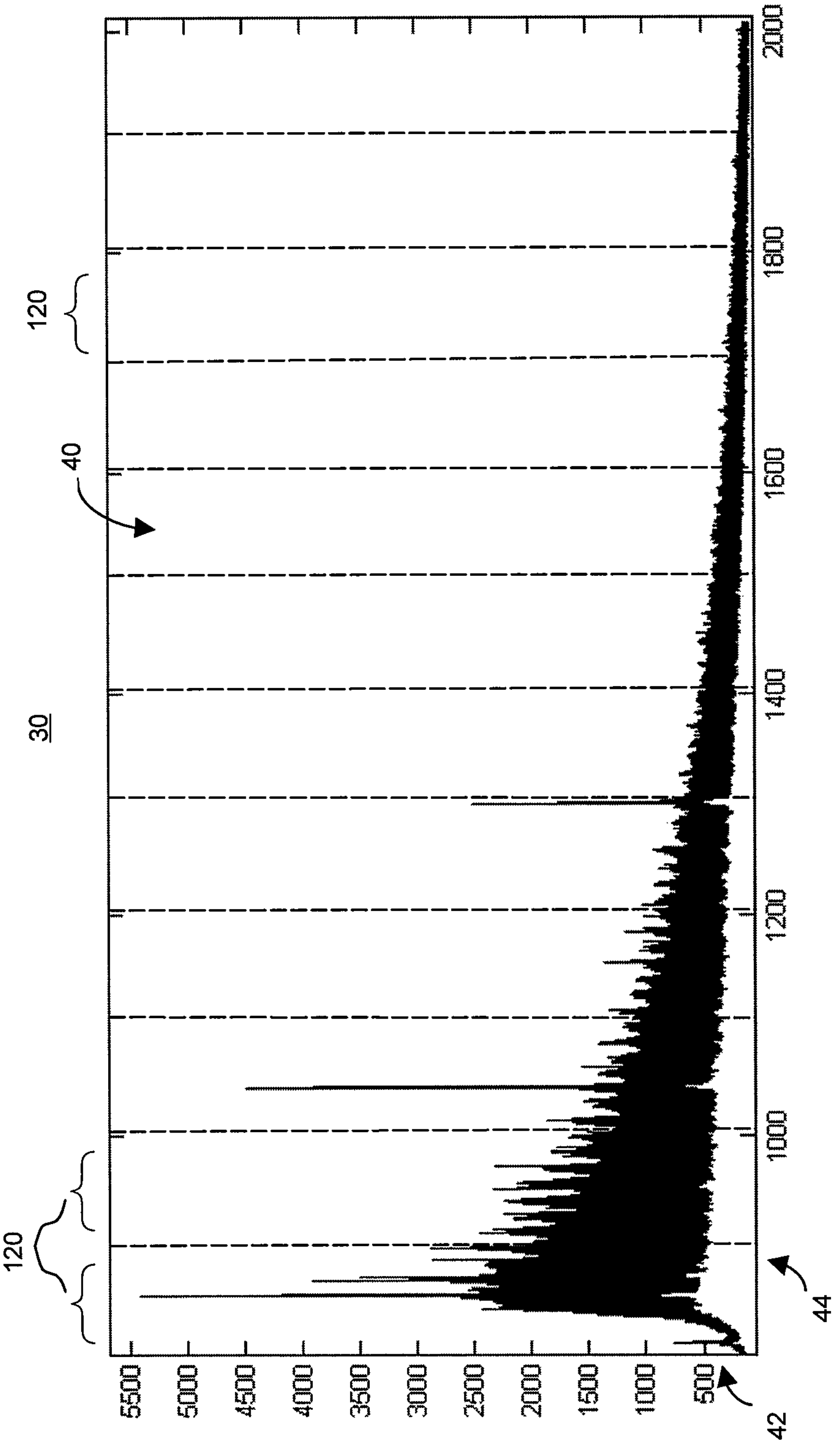
FIG. 2 is a graph illustrating an original mass spectrum as may be input into and manipulated by the system of FIG. 1.

Referring now to FIG. 2, illustrated therein is a graph 30 illustrating an original mass spectrum 40 as may be input into and analyzed by the system 10. The vertical axis 42 corresponds to signal intensity, while the horizontal axis 44 corresponds to m/z (mass/charge). The graph displays the original mass spectrum 40, which will typically comprise a real signal combined together with and obscured by a background noise or signal. As will be understood, the data corresponding to the original mass spectrum 40 is preferably input into and stored in the data storage 17, and typically the graph 30 is displayed on the display 16.sup.B.

Figure 13:
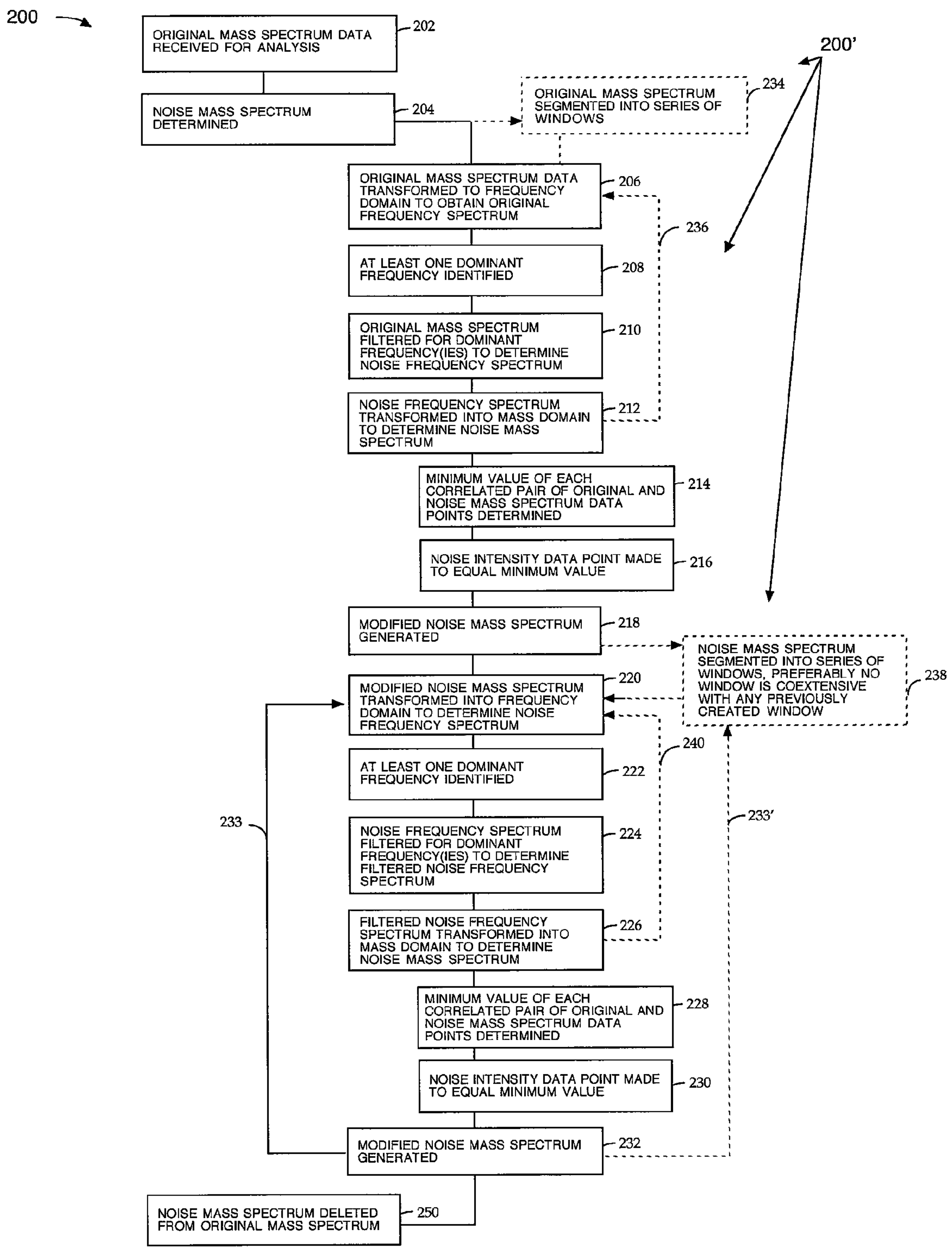
FIG. 13 is a flow diagram illustrating the steps of a method of reducing noise in a mass spectrum, in accordance with the present invention.

FIG. 13 sets out the steps of the method, referred to generally as 200, carried out by the noise reducing system 10. Data corresponding to an original mass spectrum 40 (illustrated in FIG. 2) is received (typically via the I/O device or determined by the system 10 if the system 10 comprises a spectrometer) and typically stored in data storage 17, and the noise reduction engine 14 is programmed to initiate the noise reduction analysis (Block 202). A noise mass spectrum corresponding to the background signal component in the original mass spectrum 40 is then determined (Block 204). As set out in the discussion relating to Blocks 206 to 232 below, this step may itself comprise a number of steps.

Figure 3A:
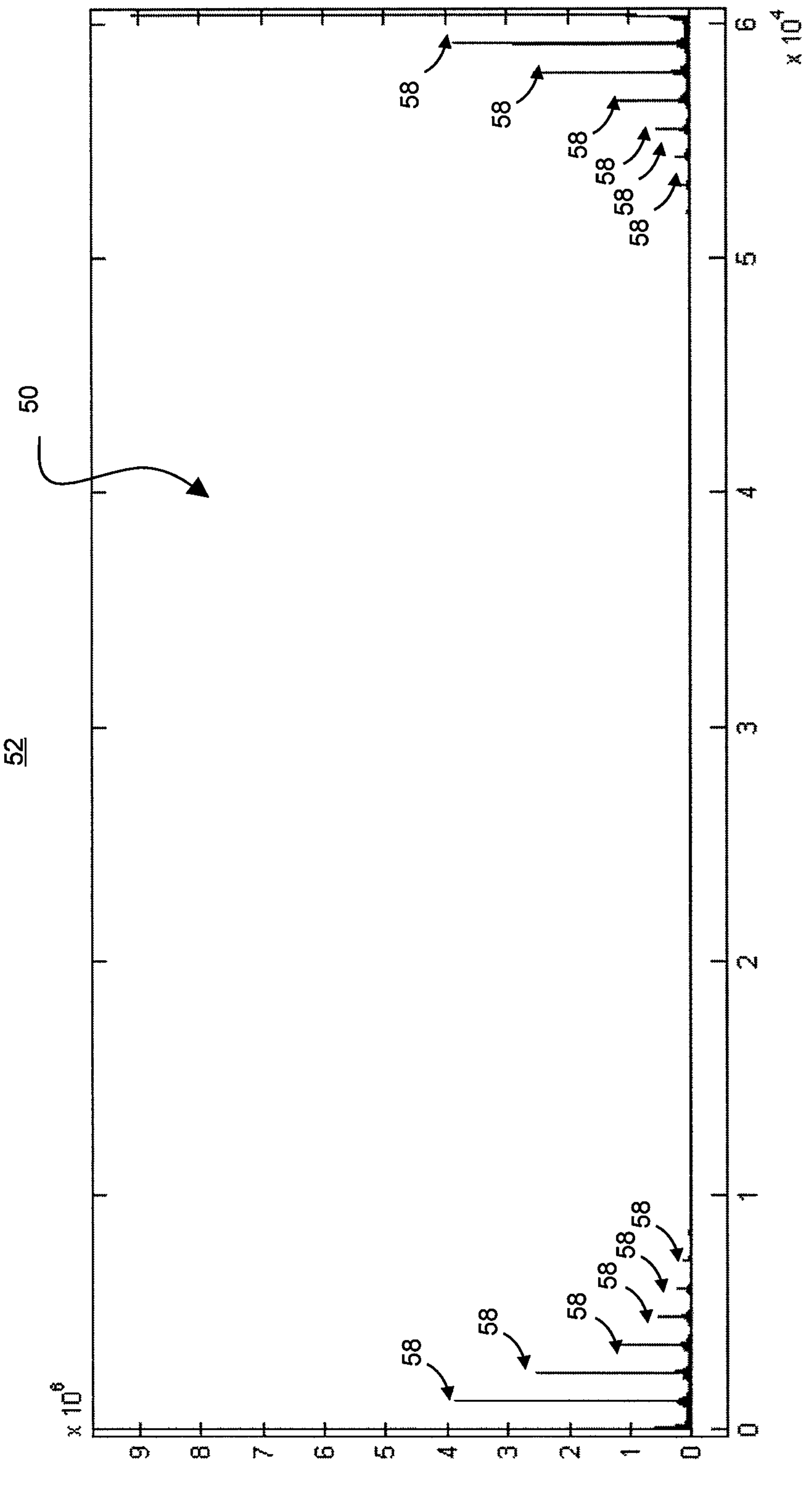
FIG. 3A is a graph illustrating an original frequency spectrum determined by transforming the original mass spectrum of FIG. 2 into the frequency domain.
Figure 3B:
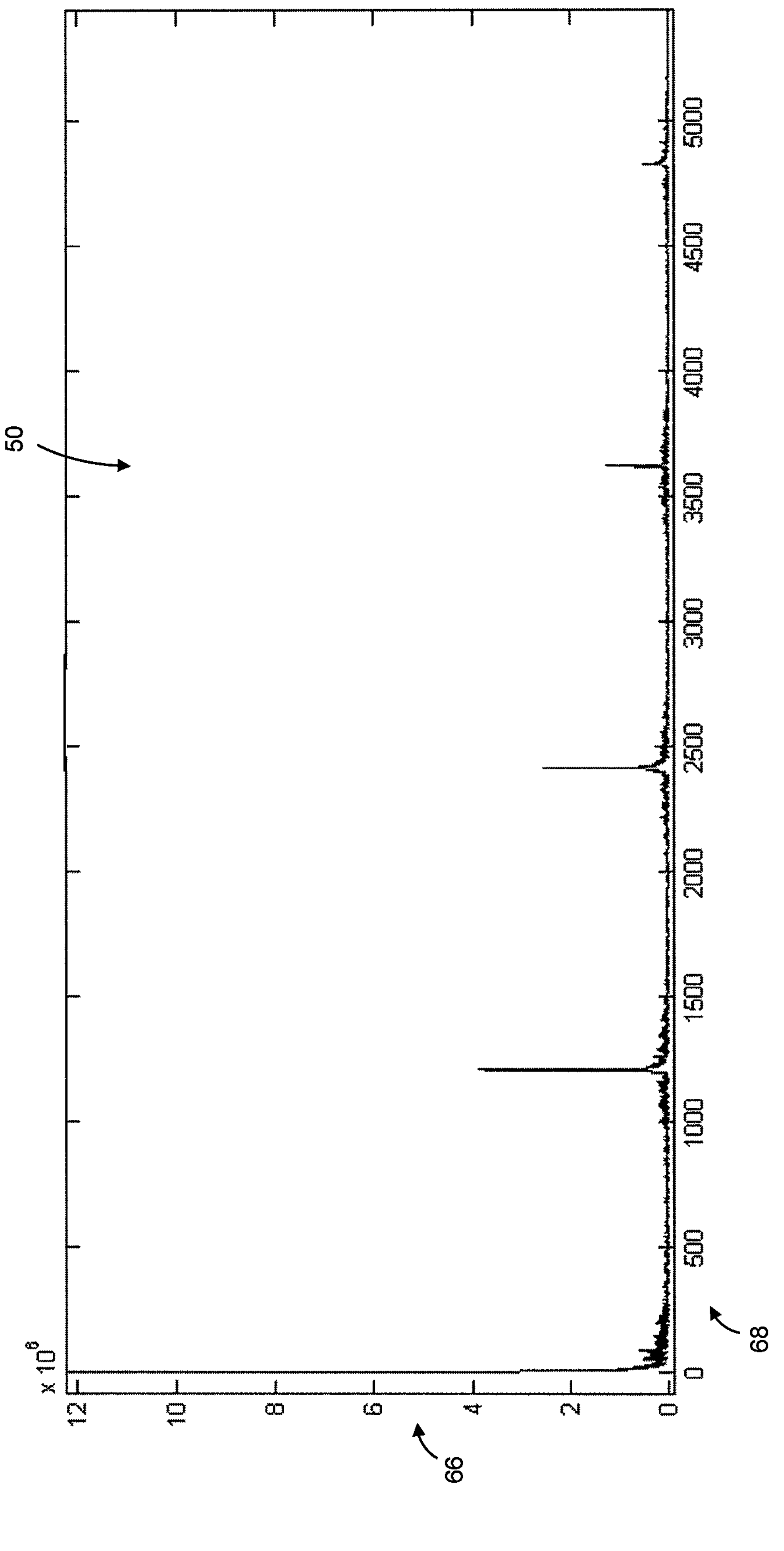
FIG. 3B is a magnified segment of the graph of FIG. 3A.

The engine 14 can be programmed to effect a transformation of the original mass spectrum 40 into the frequency domain (typically by subjecting the original mass spectrum 40 data to a Fourier Transformation, sine/cosine transform or any mathematical or experimental method known in the art) to obtain an original frequency spectrum 50, as illustrated in the graph 52 of FIG. 3A (a magnified segment of which is illustrated in the graph 52' of FIG. 3B) (Block 206). In the graph 52, the vertical axis 54 corresponds to intensity while the horizontal axis 56 corresponds to frequency.

The original frequency spectrum 50 comprises distinct peaks 58 corresponding to dominant frequencies. As will be understood, background noise is often periodic in nature, typically having a period of one atomic mass unit. Accordingly, a significant portion of the intensity of the dominant frequencies 58 may often be attributed to the noise component of the original mass spectrum 40. These dominant frequencies 58 will often correspond to the background noise's base frequency and corresponding harmonics thereof.

Figure 4:
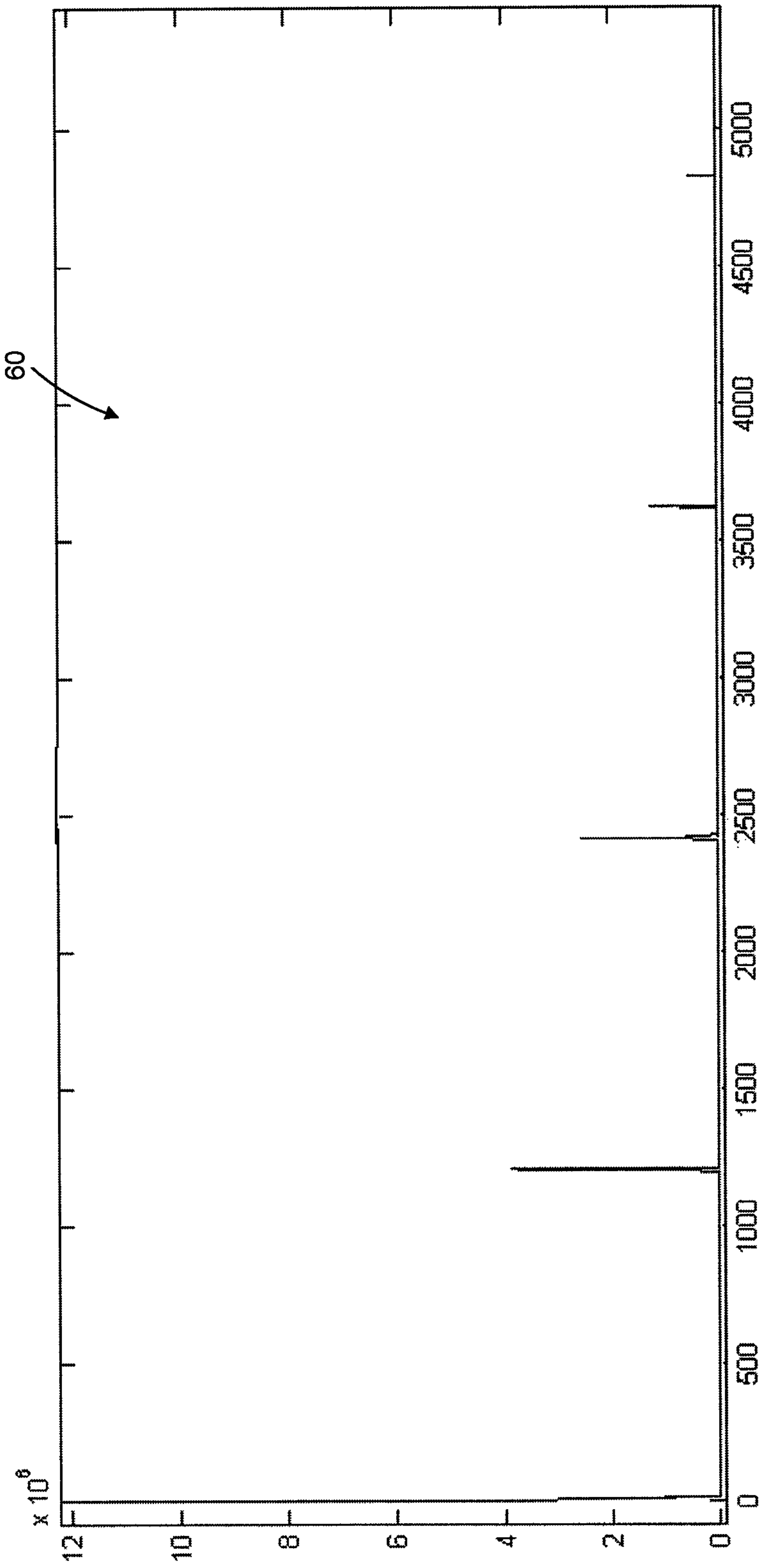
FIG. 4 is a graph illustrating a noise frequency spectrum made in accordance with the present invention and determined by selectively filtering for dominant frequencies in the original frequency spectrum of FIG. 3A.

The engine 14 preferably identifies at least one and preferably all of the dominant frequencies 58 in the original frequency spectrum 50 (although as will be understood, this step could be performed manually by a system 10 user) (Block 208). Next, the original frequency spectrum 50 is filtered for the identified dominant frequencies 58, in order to generate a noise frequency spectrum 60, as illustrated in the graph 61 of FIG. 4 (Block 210).

Figure 3C:
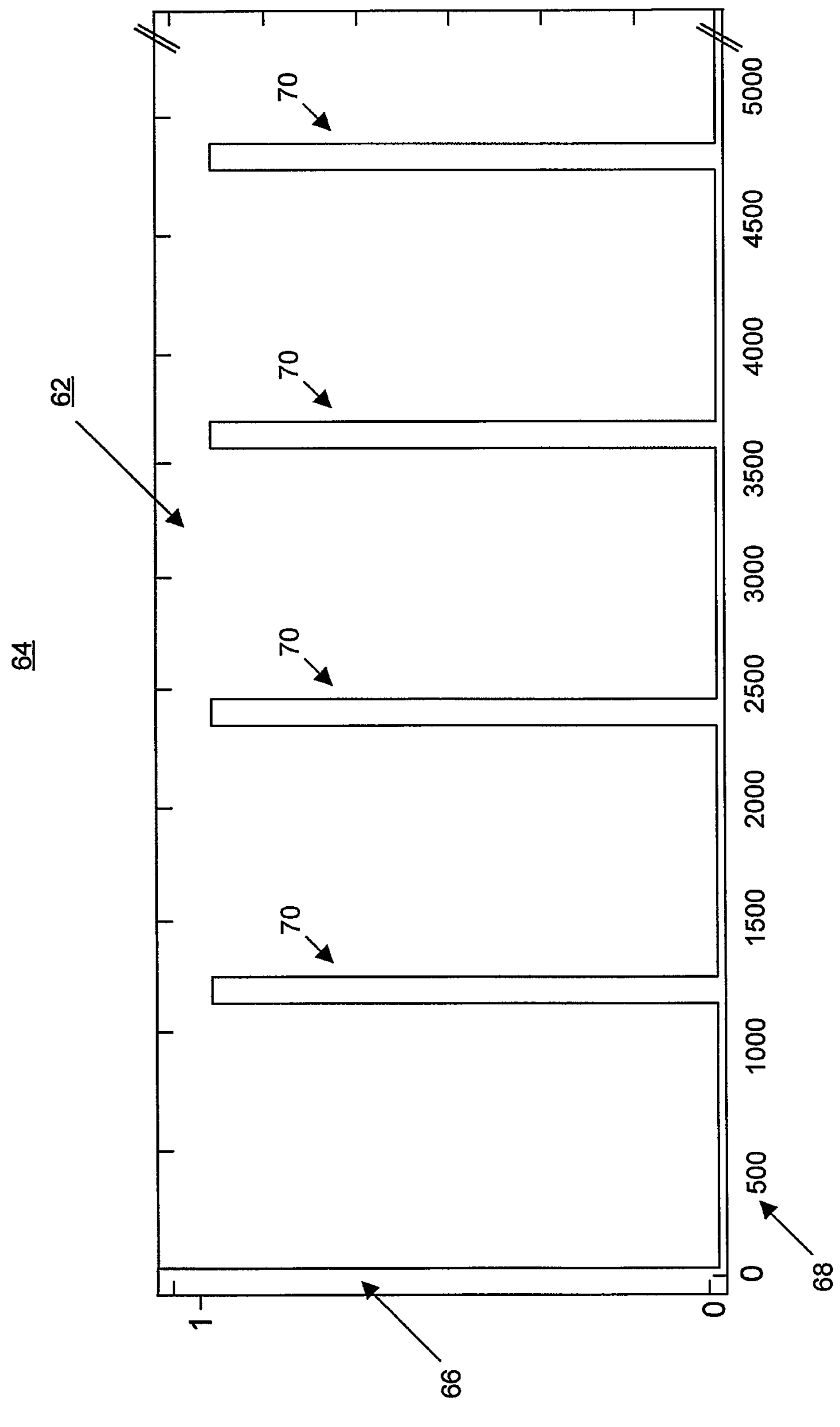
FIG. 3C is a schematic diagram of a segment of a filter made and used in accordance with the present invention to filter the original frequency spectrum of FIG. 3A, the segment corresponding to the original frequency segment illustrated in FIG. 3B.

To accomplish this, a filter 62, such as that depicted for illustrative purposes in the schematic graph 64 of FIG. 3C, may be created to selectively filter for the identified dominant frequencies 58. Typically the data filter 62 will be implemented through software in the reduction engine 14, and will often not be displayed to the end user. As can be seen, the vertical axis 66 represents the ratio (from 0 to 1) of the original frequency spectrum 50 to be retained or filtered for. The horizontal axis 68 corresponds to frequency. The filter 62 preferably comprises a plurality of tabs 70 corresponding to the number of dominant frequencies 58 identified in Block 208. As can be seen from the juxtaposition of FIGS. 3A and 3B, via the tabs 70, the filter 62 is configured to preserve or filter for 100% of the identified dominant frequencies 58 data. Conversely, the filter 62 discards the frequency data in the original frequency spectrum 50 not forming part of the identified dominant frequencies data 58, resulting in the noise frequency spectrum 60 data.

Figure 5:
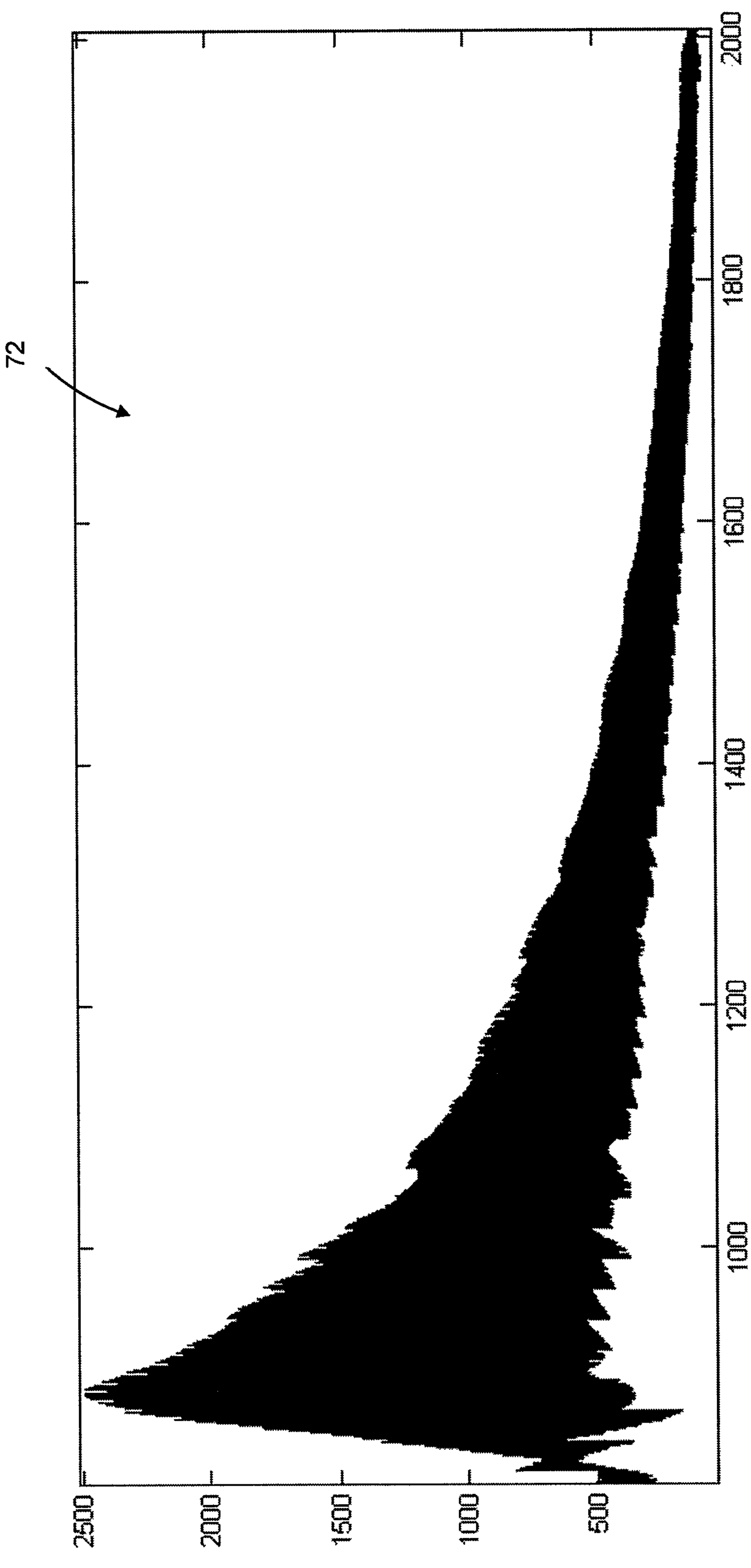
FIG. 5 is a graph illustrating a noise mass spectrum made in accordance with the present invention and determined by transforming the noise frequency spectrum of FIG. 4 into the mass domain.

Subsequently, the engine 14 is preferably configured to determine a noise mass spectrum 72 illustrated in the graph 74 of FIG. 5, typically by affecting an inverse Fourier transformation of the noise frequency spectrum 60 data into the mass domain (Block 212).

As will be understood, the noise mass spectrum 72 data represents an estimate of the background noise signal component of the original mass spectrum 40.

Figure 6:
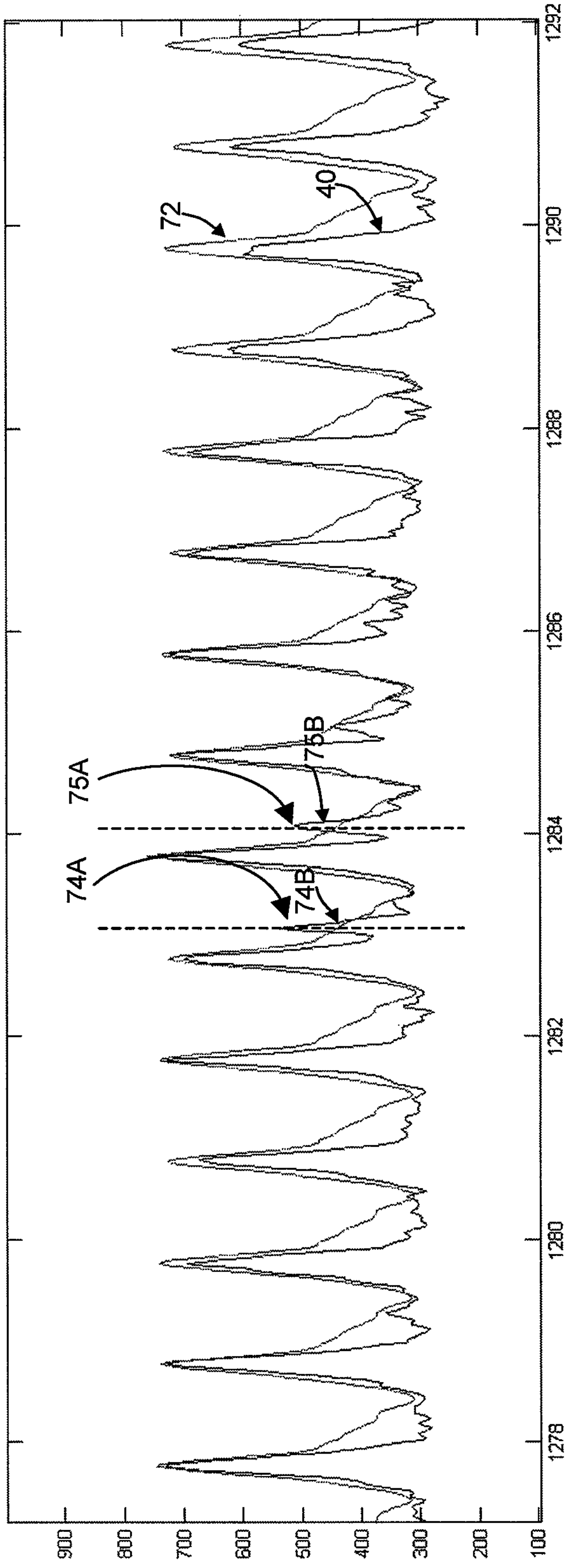
FIG. 6 is a graph illustrating a magnified portion of the noise mass spectrum of FIG. 5 overlaid together with a corresponding magnified portion of the original mass spectrum of FIG. 2.

Referring to FIG. 6, illustrated therein is a graph 76 overlay of a close-up segment of the original mass spectrum 40 with a corresponding magnified segment of the noise mass spectrum 72. As will be understood, the noise 72 and original 40 mass spectrums are formed of many thousands of data points. Data points in both mass spectrums 72 and 40 may be correlated as one data point should exist in each spectrum 40, 72 corresponding to each m/z value.

Referring to exemplary data points 74A and 74B (and 75A and 75B) of the original mass spectrum 40 and the noise mass spectrum 72, respectively, each pair is correlated to the same m/z value (as indicated by the dotted lines). It can be seen that the noise mass spectrum 72 may have a higher intensity value at certain m/z values than the original mass spectrum 40. However, as will be understood, this indicates an artifact in estimation of the background noise signal component, as the noise component should not exceed the combined background and real signals of the original mass spectrum 40 (at corresponding m/z values). This artifact is a result of the real peak(s) in the original mass spectrum 40, for example at points 74A, 75A where the original mass spectrum 40 has a higher intensity value than the corresponding points 74B, 75B on the noise mass spectrum 72.

Accordingly, to further refine the background signal estimate, the noise mass spectrum 72 data is revised such that for each correlated data point in the noise mass spectrum 72 and original mass spectrum 40 (having the same m/z value), the minimum intensity value of the two data points is determined (Block 214). In turn, the noise mass spectrum is preferably modified by making the noise intensity data point equal to the minimum value (Block 216).

For the sake of clarity, the steps of Blocks 214 and 216 may be implemented using the function set out in Equation 1, below:

$$f'(x)=\min(f(x),g(x)) \qquad \text{EQ. 1:}$$

where x represents m/z and f(x) represents the intensity value of the noise mass spectrum 72 and g(x) represents the intensity value of the original mass spectrum 40, and f'(x) represents the modified noise mass spectrum.

Figure 7A:
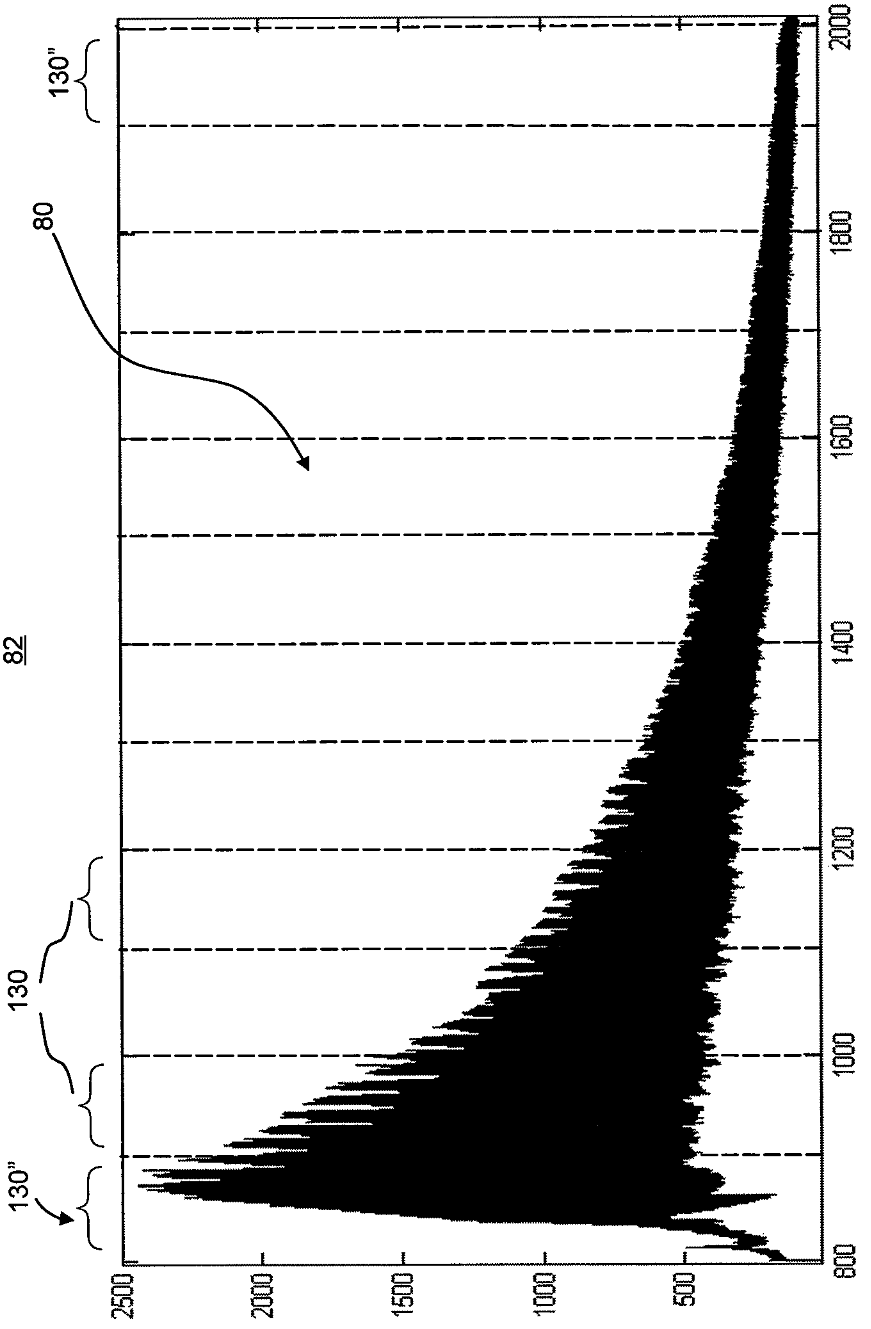
FIG. 7A is a graph illustrating the noise mass spectrum made in accordance with the present invention by determining the minimum value of each corresponding pair of intensity data points from the complete noise mass spectrum and original mass spectrum portions of which were illustrated in FIG. 6.
Figure 7B:
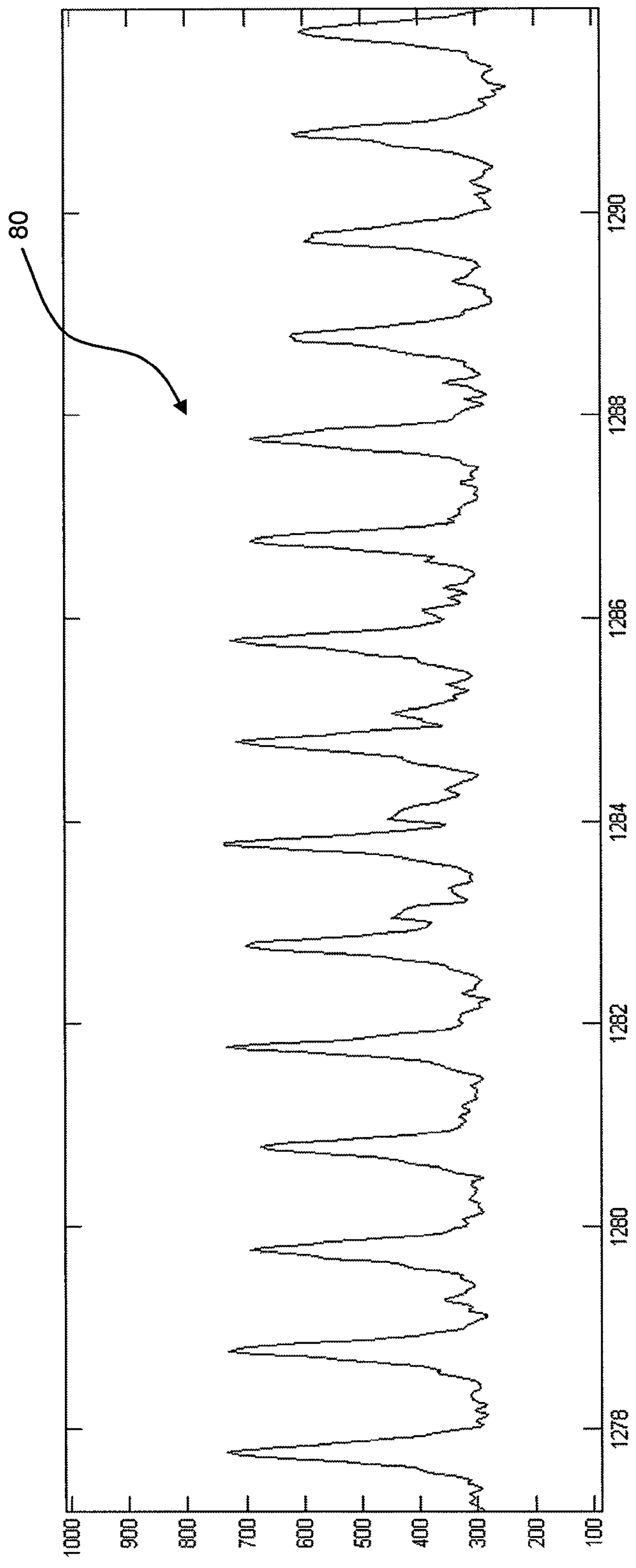
FIG. 7B is a graph illustrating a magnified portion of the noise mass spectrum of FIG. 7A corresponding to the magnified portions in FIG. 6.

Completion of Block 216 for all of the correlated data points in the original and noise mass spectrums 40, 72, results in a modified noise mass spectrum 80, as illustrated in the graph 82 of FIGS. 7A (and 7B) (Block 218).

Figure 8:
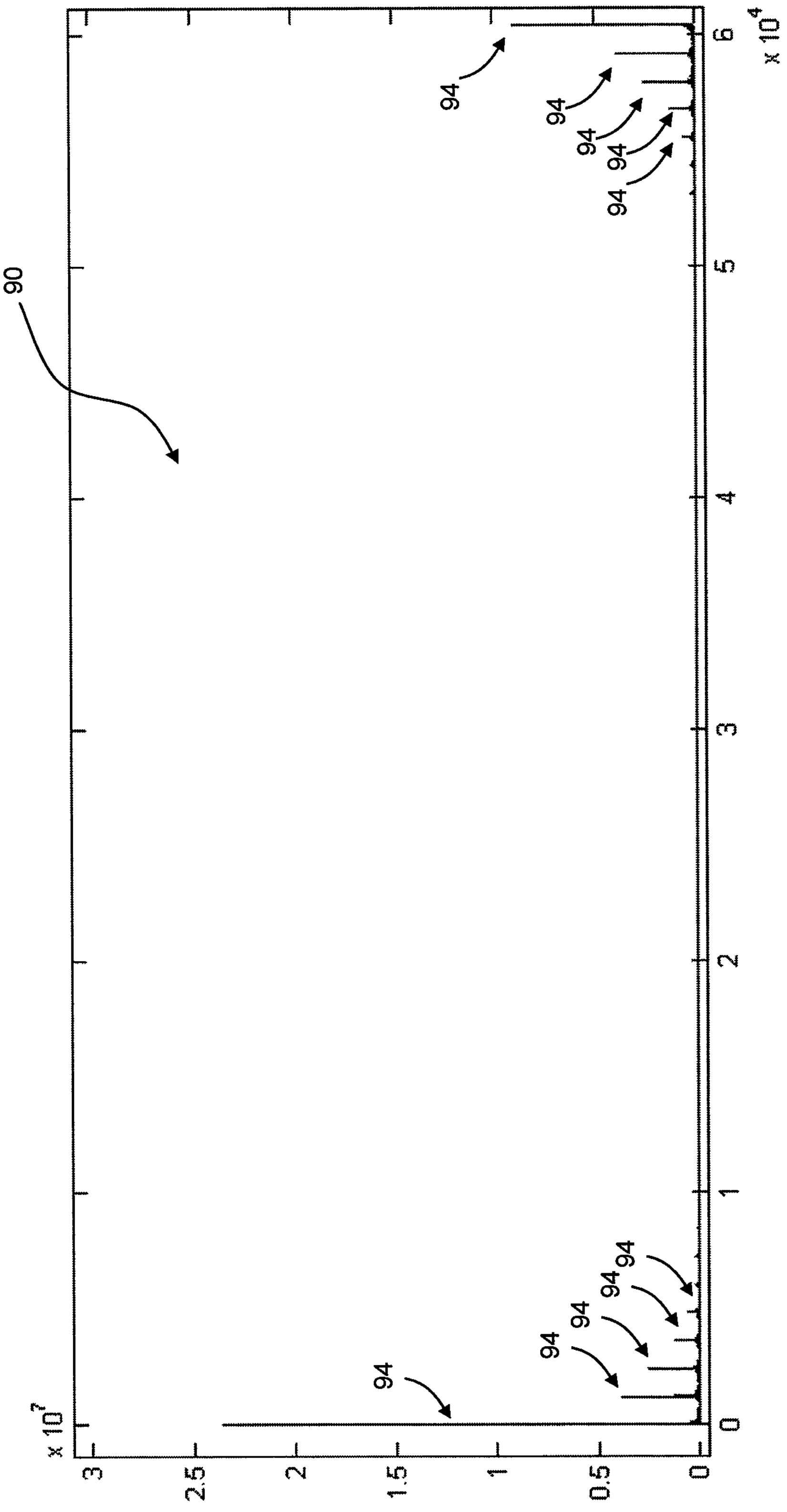
FIG. 8 is a graph illustrating a noise frequency spectrum determined by transforming the noise mass spectrum of FIG. 7A into the frequency domain.

Next, a transformation of the modified noise mass spectrum 80 into the frequency domain is effected (again, typically by subjecting the noise mass spectrum 80 data to a Fourier Transformation) to obtain a noise frequency spectrum 90, as illustrated in the graph 92 of FIG. 8 (Block 220).

Figure 9:
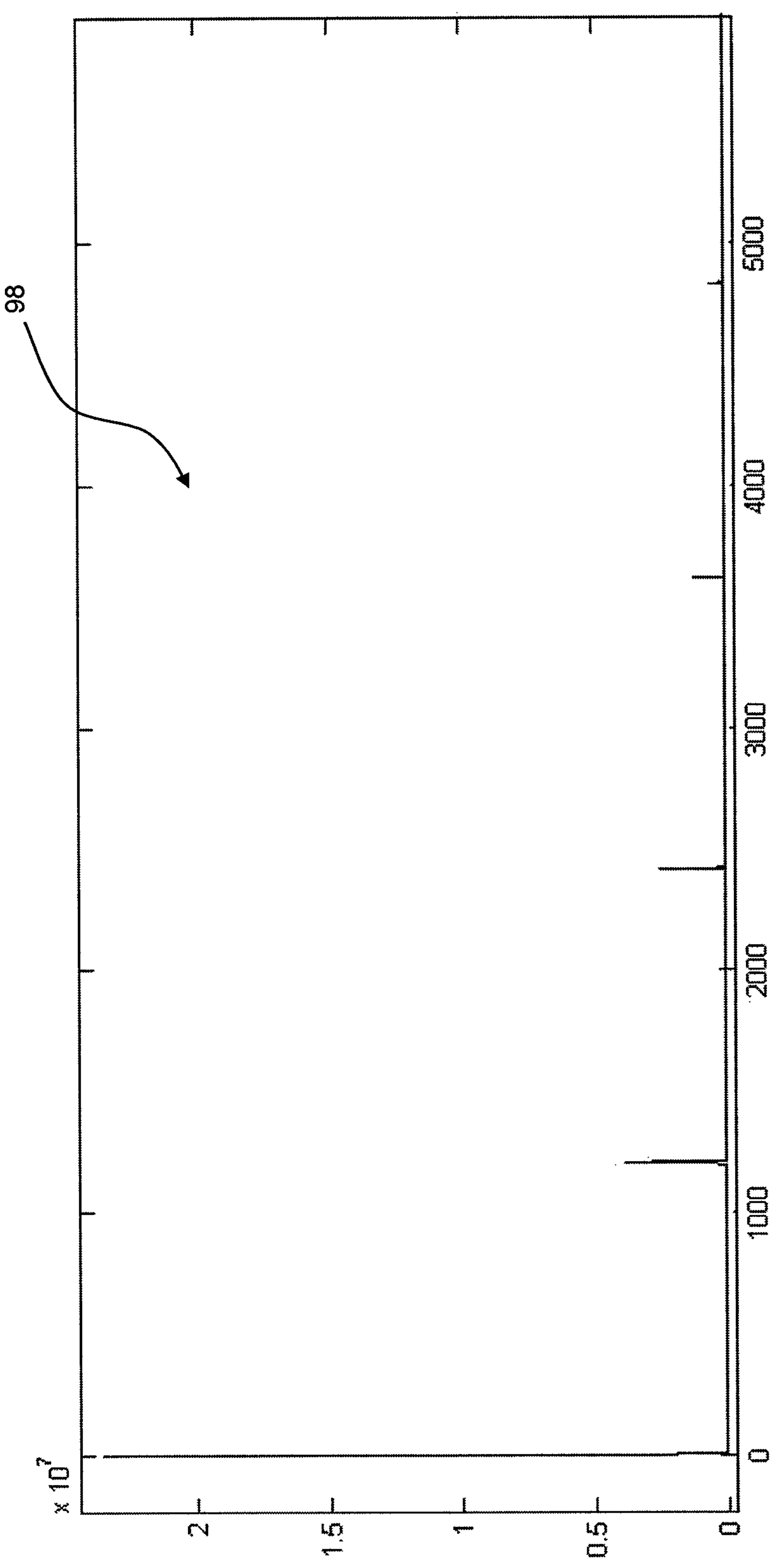
FIG. 9 is a graph illustrating a noise frequency spectrum made in accordance with the present invention and determined by selectively filtering for dominant frequencies in the noise frequency spectrum of FIG. 8.

Next, at least one and preferably all of the dominant frequencies 94 in the noise frequency spectrum 90 are identified (Block 222). The noise frequency spectrum 90 is then filtered for the identified dominant frequencies 94, in order to generate a filtered noise frequency spectrum 98, a portion of which is illustrated in the graph 99 of FIG. 9 (Block 224).

Typically, the filter 62 of FIG. 3B created in reference to Block 210, may be reused to selectively filter for the identified dominant frequencies 94, in creating the noise frequency spectrum 98.

Figure 10:
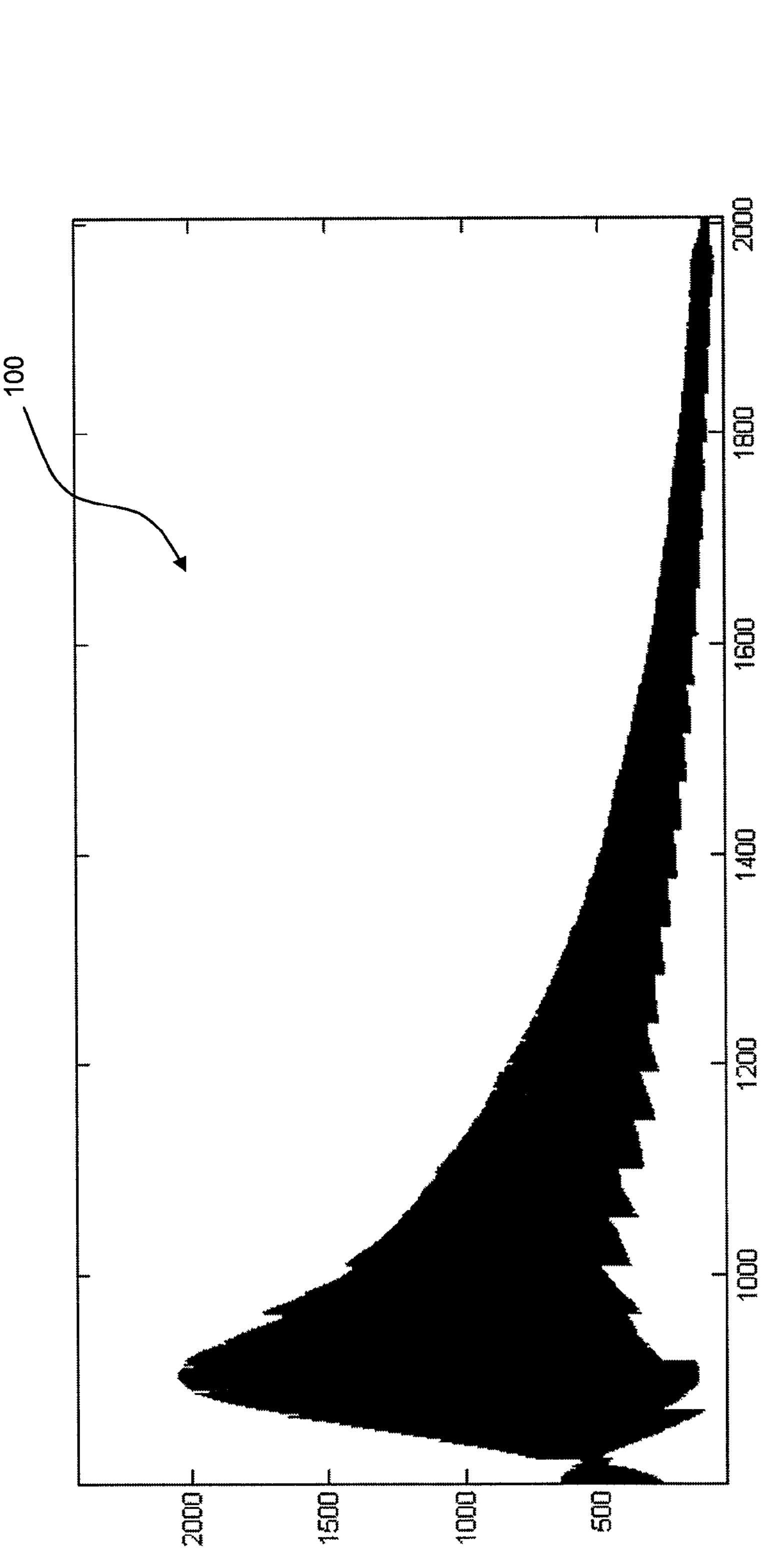
FIG. 10 is a graph illustrating a noise mass spectrum made in accordance with the present invention and determined by transforming the noise frequency spectrum of FIG. 9 into the mass domain.

Subsequently, a noise mass spectrum 100 as illustrated in the graph 102 of FIG. 10 is generated, typically by affecting an inverse Fourier Transformation of the noise frequency spectrum 98 data into the mass domain (Block 226).

To further refine the background signal estimate, in a manner similar to that discussed in relation to Block 216, the noise mass spectrum 100 data is revised such that for each correlated data point in the noise mass spectrum 100 and original mass spectrum 40 (correlated by sharing the same m/z value), the minimum intensity value of the two data points is determined (Block 228). In turn, the noise mass spectrum 100 is preferably modified by making the noise intensity data point equal to the minimum value (Block 230). As will be understood, the steps of Blocks 228 and 230 may be implemented using Equation 1, above.

Figure 11:
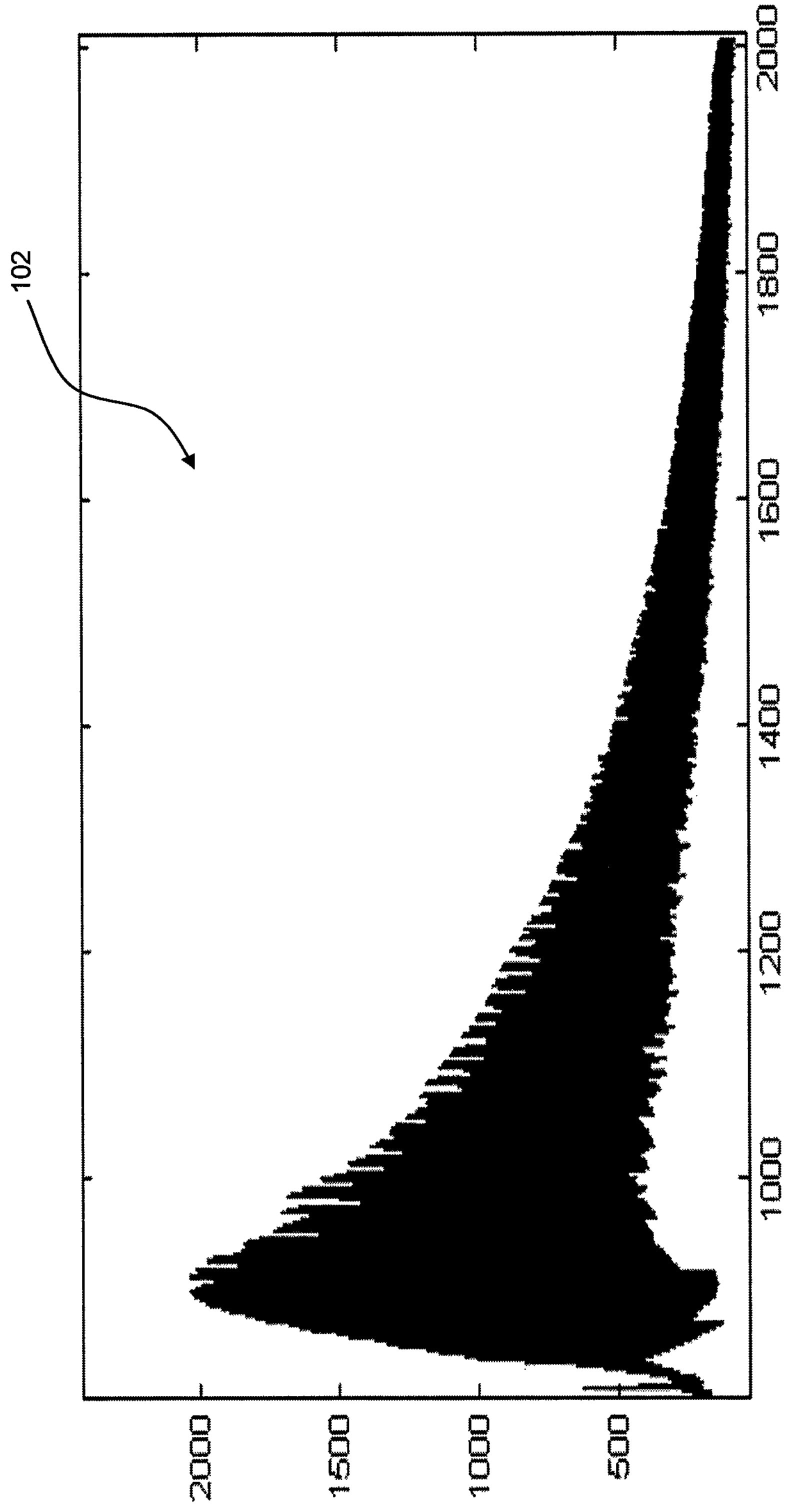
FIG. 11 is a graph illustrating the noise mass spectrum made in accordance with the present invention by determining the minimum value of each corresponding pair of intensity data points from the complete noise mass spectrum of FIG. 10 and the original mass spectrum of FIG. 2.

Completion of Block 230 for all of the correlated data points in the original and noise mass spectrums 40, 100, results in a modified noise mass spectrum 102, as illustrated in the graph 104 of FIG. 11 (Block 232).

The steps of Blocks 220 to 232 will preferably (but not necessarily) be repeated multiple times (as indicated by the line 233 in FIG. 13), each repetition further refining the background signal estimate (noise mass spectrum 102) and making it more closely approximate the actual background signal. The steps of Blocks 220 to 232 may be repeated a predetermined number of times (for example from 1 to 20 times, typically, but more repetitions may be necessary in some instances), or the engine 14 may be programmed to discontinue the repetitions automatically once the difference between the respective versions of the modified noise mass spectrum 102 data and the noise mass spectrum 100 data falls within a predetermined range.

Figure 12:
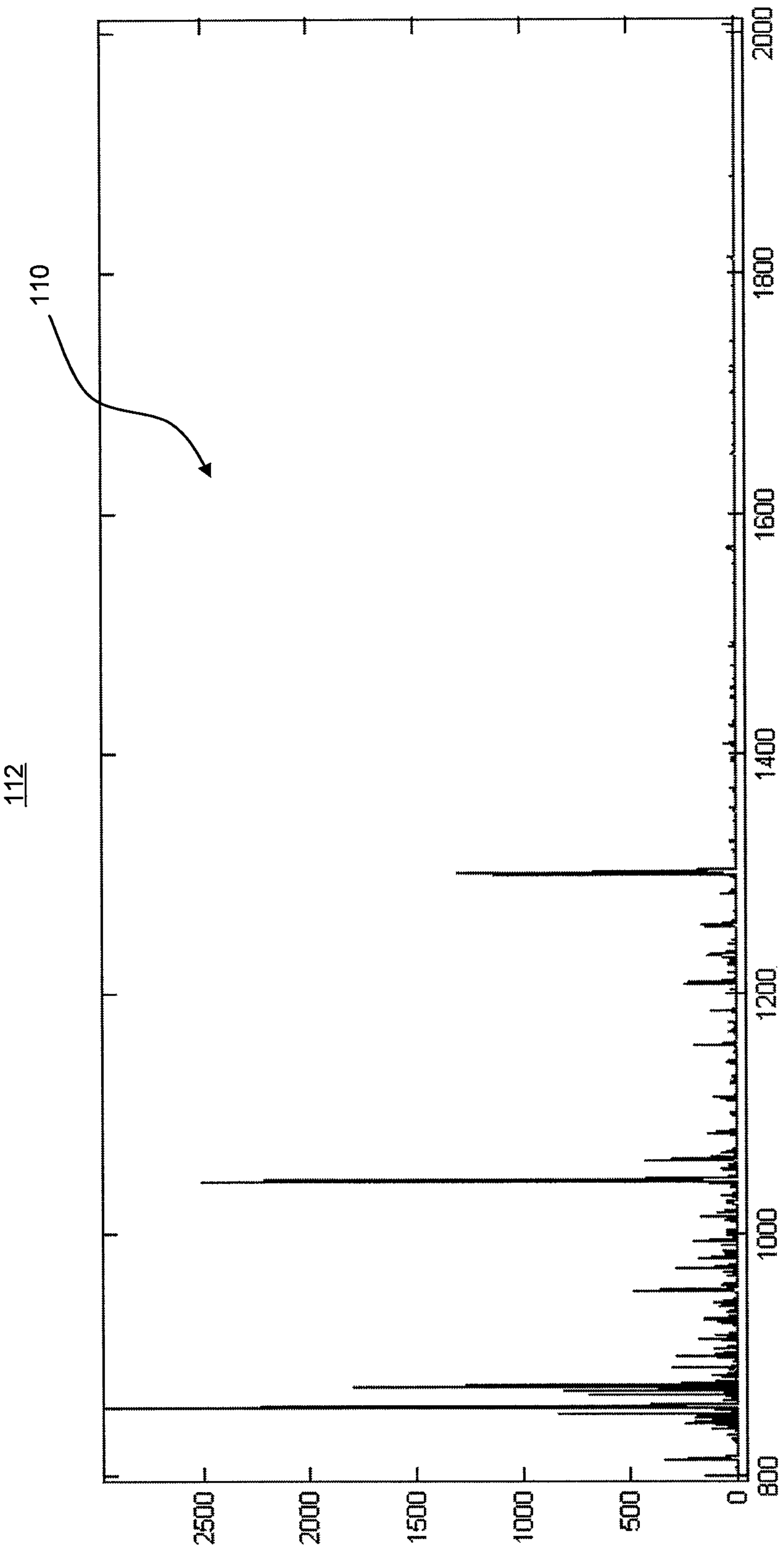
FIG. 12 is a graph illustrating a corrected mass spectrum made in accordance with the present invention and determined by subtracting the noise frequency spectrum of FIG. 11 from the original mass spectrum of FIG. 2.

Once the final version of the modified noise mass spectrum 102 has been determined, the noise mass spectrum 102 is subtracted from the original mass spectrum 40, resulting in a corrected mass spectrum 110 as illustrated in graph 112 in FIG. 12 (Block 250). As will be understood, the corrected mass spectrum 110 corresponds to the intended real signal of the sample to be analyzed, with a substantial portion of the background noise (present in the original mass spectrum 40) removed.

In an alternate embodiment 200', it has been found that improved results may sometimes be obtained by segmenting the original mass spectrum 40 into a plurality of initial windows 120 (as illustrated in FIG. 2 and separated by dotted lines) prior to Block 206 (Block 234). Typically, the windows 120 are of equal dimensions, although this is not required. Preferably, Blocks 206 through 212 inclusive are each completed separately for one initial window 120, before Blocks 206 through 212 are commenced and completed for another (typically successive) initial window 120, as indicated by dotted line 236.

Of course, as will be understood, the description above of each of Blocks 206 through 212 refer to mass spectrums and corresponding frequency domains as a whole. However, if the original mass spectrum 40 is to be processed by initial windows 120 separately pursuant to Block 234, as appropriate, references to whole mass spectrums and frequency domains in the descriptions for the Blocks 206 through 212 should be understood to refer to the mass spectrum and frequency domain segments corresponding to the initial window 120 being processed during the specific iteration of those Blocks.

Once the segmentation of the original mass spectrum 40 into initial windows 120 pursuant to Block 222 and the subsequent completion of Blocks 206 through 212 for each initial window 12 and the modified noise mass spectrum 80 has been generated pursuant to Blocks 214 through 218, the noise mass spectrum 80 is segmented into a series of a plurality of subsequent windows 130 (as illustrated in FIG. 7A) prior to Block 220 (Block 238). Preferably, the subsequent windows 130 in the series are configured such that no subsequent window 130 is coextensive with any initial window 12 in the mass domain. It is also preferable if (other than at the beginning and end of the mass spectrums), the windows 130 do not share a leading or termination edge (indicated by the dotted lines in FIG. 7A) with any initial windows 12.

Accordingly, if the subsequent windows 130 are configured to be generally of the same size as the initial windows 12, the subsequent window segments 130 will be shifted in the mass domain such that the first 130' and last 130" subsequent window segments will typically be smaller than the remainder of the subsequent windows 130.

Each of Blocks 220 through 226 inclusive is completed separately for one subsequent window 130 (including 130', 130"), before Blocks 220 through 226 are completed for another (typically successive) subsequent window 130, as indicated by dotted line 240. As with the initial embodiment discussed above, Blocks 220 through 232, may be repeated for each subsequent repetition (as indicated by dotted line 233' instead of line 233) preferably a series of new subsequent windows is created in Block 238 such that no new subsequent window 130 is coextensive with any subsequent window 130 in any previous series. It is also preferable if (other than at the beginning and end of the mass spectrums), any new subsequent windows 130 do not share a leading or termination edge (indicated by the dotted lines in FIG. 7A) with any subsequent windows 120 in a previous series.

To avoid or minimize the overlap of leading or terminating edges, for each subsequent repetition, a series of new subsequent windows 130 may be configured to generally have the same size as previous series of windows 130, but be shifted in location relative to m/z value. Alternatively, the size of the windows 130 may be changed for different series of windows 130 to minimize the overlapping of leading or terminating edges.

Computer-Implemented System

Figure 14:
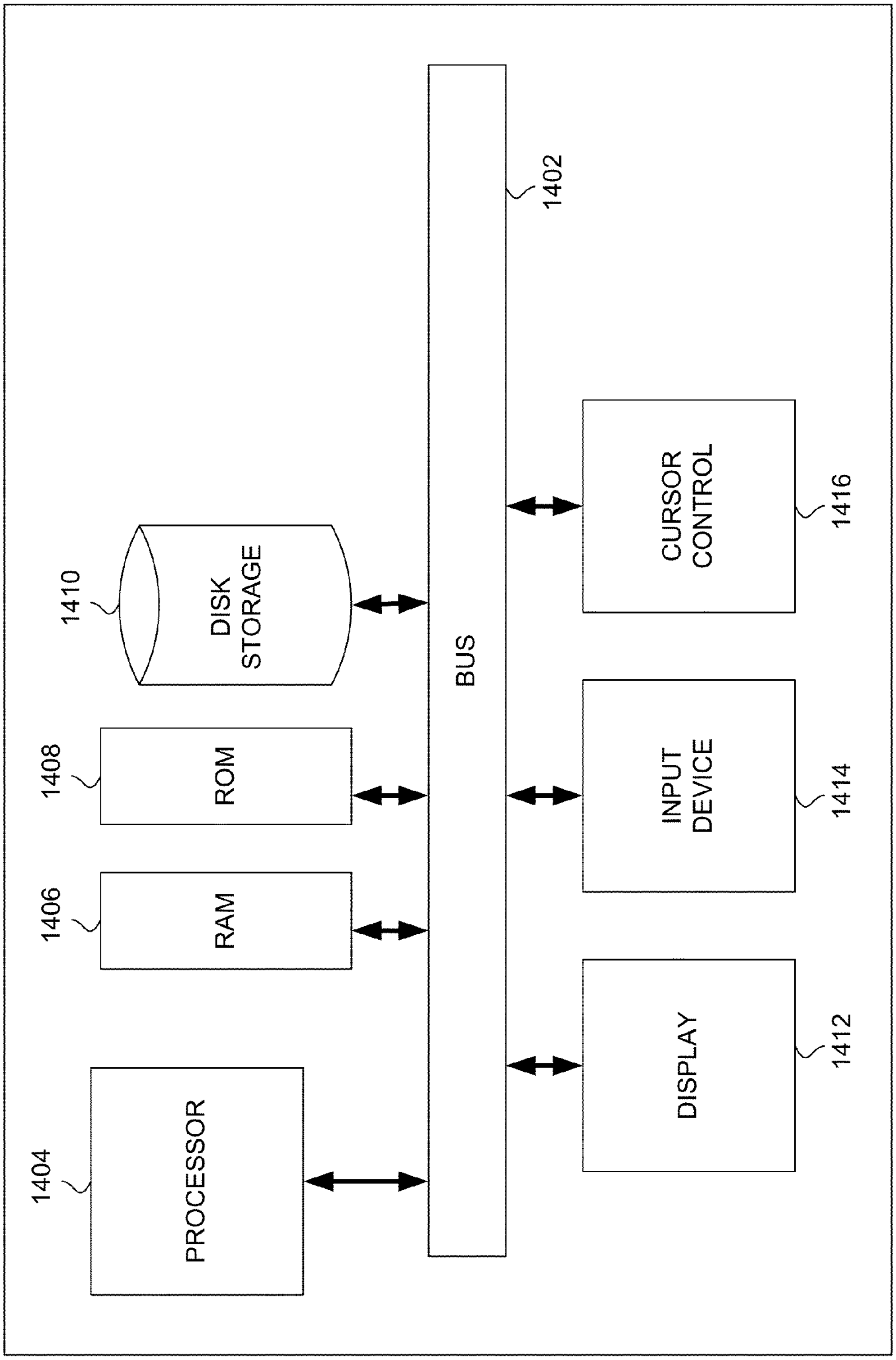
FIG. 14 is a block diagram that illustrates a computer system, upon which embodiments of the present teachings may be implemented.

FIG. 14 is a block diagram that illustrates a computer system 1400, upon which embodiments of the present teachings may be implemented. Computer system 1400 includes a bus 1402 or other communication mechanism for communicating information, and a processor 1404 coupled with bus 1402 for processing information. Computer system 1400 also includes a memory 1406, which can be a random access memory (RAM) or other dynamic storage device, coupled to bus 1402 for storing instructions to be executed by processor 1404. Memory 1406 also may be used for storing temporary variables or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT) or liquid crystal display (LCD), for displaying information to a computer user. An input device 1414, including alphanumeric and other keys, is coupled to bus 1402 for communicating information and command selections to processor 1404. Another type of user input device is cursor control 1416, such as a mouse, a trackball or cursor direction keys for communicating direction information and command selections to processor 1404 and for controlling cursor movement on display 1412. This input device typically has two degrees of freedom in two axes, a first axis (i.e., x) and a second axis (i.e., y), that allows the device to specify positions in a plane.

A computer system 1400 can perform the present teachings. Consistent with certain implementations of the present teachings, results are provided by computer system 1400 in response to processor 1404 executing one or more sequences of one or more instructions contained in memory 1406. Such instructions may be read into memory 1406 from another computer-readable medium, such as storage device 14140. Execution of the sequences of instructions contained in memory 1406 causes processor 1404 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 1404 for execution. Such a medium may take many forms, including but not limited to, non-volatile media, volatile media, and transmission media. Non-volatile media includes, for example, optical or magnetic disks, such as storage device 1410. Volatile media includes dynamic memory, such as memory 1406. Transmission media includes coaxial cables, copper wire, and fiber optics, including the wires that comprise bus 1402.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 1404 for execution. For example, the instructions may initially be carried on the magnetic disk of a remote computer. The remote computer can load the instructions into its dynamic memory and send the instructions over a network. The remote computer can receive data over the network and place the data on bus 1402. Bus 1402 carries the data to memory 1406, from which processor 1404 retrieves and executes the instructions. The instructions received by memory 1406 may optionally be stored on storage device 1410 either before or after execution by processor 1404.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Periodic Noise in Separation Coupled Mass Spectrometry

As described above, periodic noise in mass spectrometry is normally associated with very low flow rate electrospray ionization (ESI) and matrix-assisted laser desorption/ionization (MALDI). This noise is generally characterized by equally spaced peaks across a large mass range.

Periodic noise, however, has also been observed in data from separation coupled mass spectrometry. This noise affects both qualitative and quantitative measurements performed from this data.

For example, periodic noise is observed in liquid chromatography coupled mass spectrometry (LCMS). However, at higher flow rates periodic noise is generally not obvious in LCMS unless a number of spectra are combined, for example, by summing Even though the period noise is not obvious, the noise ions are still present in individual spectra and can overlap small peaks, causing mass assignment and isotope ratios inaccuracies. The periodic noise in LCMS can also impact the detection limit in quantitative experiments. An impact on the detection limit is obvious in mass spectrometry (MS) quantitation (e.g. selected ion monitoring (SIM) or selected reaction monitoring (SRM) quantitation). The presence of periodic noise is also observed in tandem mass spectrometry spectra, or mass spectrometry/mass spectrometry (MSMS) spectra. Periodic noise can, therefore, affect multiple reaction monitoring (MRM) quantitation at the highest sensitivities and lowest flow rates, for example. Low flow chromatography is common in peptide analysis, including quantitation, and is being explored for small molecule quantitation. Noise has been observed to increase as the flow rate is reduced.

The level of the periodic noise found in LCMS has been observed to track the total ion current (TIC). For example, it is dependent on the complexity and concentration of the species that are emerging from the column at any particular time. It also seems highly likely that the noise varies from sample to sample. For example, in drug metabolism and pharmacokinetics (DMPK) studies, the noise is probably different for different individuals, depends on the sample type (urine, bile, etc.), and changes over time for one individual.

Thus the periodic noise in LCMS and mass analyzers for tandem mass spectrometry (MSMS) data likely affects qualitative (mass accuracy, isotope ratios) and quantitative limit of detection and quantification (LOD/Q) measurements. Removing this periodic noise is, therefore, desirable.

In various embodiments, a periodic noise contribution is removed from LCMS data to improve the quality of the data and/or the detection limit. Periodic noise is removed from spectra by the iterative procedure described above. A Fourier transform (FT) of the data is obtained and the periodic frequencies are found. An inverse transform is performed on only these frequencies to generate an estimate of the background. Since the presence of peaks affects the initial FT, peaks that are above the background estimate are removed (set equal to the estimate). The process is repeated until only a small number of changes occur.

In various embodiments, periodic noise is removed from LCMS or MSMS data by combining several adjacent spectra in order to get an estimate of the noise. For LCMS data, for example, the spectra are processed in windows, since the noise changes during the analysis. For each window, the spectra are summed and processed to generate an estimate of the background, which can be used in two ways.

First, the estimate can be subtracted from the summed spectrum generating a single spectrum for the LC window. The filtered spectra from all windows can be combined to generate a single spectrum that represents the entire LCMS run. Also, the single spectra obtained here can be used in metabolomics to avoid the need for retention time alignment, while retaining the ability of the LC to reduce ion suppression. In addition, these single spectra can be used to detect the presence of metabolite masses, which can then be used to generate extracted ion chromatograms (XICs) to identify isomers.

Second, the estimate can be subtracted from the individual spectra in order to generate a filtered data set that contains the same number of spectra as the original run. These spectra can be further processed to generate XICs, etc.

MSMS periodic noise can also be estimated from the sum of several spectra if it is approximately constant over the range chosen, i.e. the spectra have similar retention times in LCMSMS, or was acquired from the same spot in a MALDI experiment.

Quantitation normally measures a single quantity (a mass or mass pair) during the course of a liquid chromatography (LC) run, so the experiment is modified to generate a spectrum (not necessarily of the entire mass range) that can be processed to determine the noise background.

In SIM mode, a single mass is monitored for the duration of the experiment. SIM is single ion monitoring, whereas the multiple ion equivalent is known as MIM. Since individual ions are normally monitored, the presence and extent of periodic noise cannot be determined.

In various embodiments for SIM or MIM mode, a narrow mass range spectrum (perhaps 5-10 amu) is acquired. The periodic noise in the region around the mass and retention time of interest is determined One or more adjacent spectra are combined to calculate or estimate the periodic noise, for example. The estimated or calculated periodic noise is then subtracted from each spectrum in the retention time range of interest. The processed signal is quantitated by generating an XIC from the processed spectra or, if the background offset is low, measuring the spectral peak height (single spectrum or sum).

Scanning reduces the amount of time spent looking at the ion of interest, and thus potentially the sensitivity, but can improve the signal to noise if the overall process reduces the noise more. This tradeoff is not true if the mass spectrometer inherently generates full scan data, i.e. a time-of-flight (TOF).

In an MRM experiment, periodic noise can also be observed in MSMS data. In various embodiments, the periodic noise is estimated from the sum of several product ion spectra. For example, a small mass range around the fragment ion of interest is scanned. Several scans are summed to generate and estimate the periodic noise. The periodic noise from the individual spectra. Finally, XICs are generated for quantitation.

Systems and Methods of Data Processing

Separation Coupled Mass Spectrometry Systems

Figure 15:
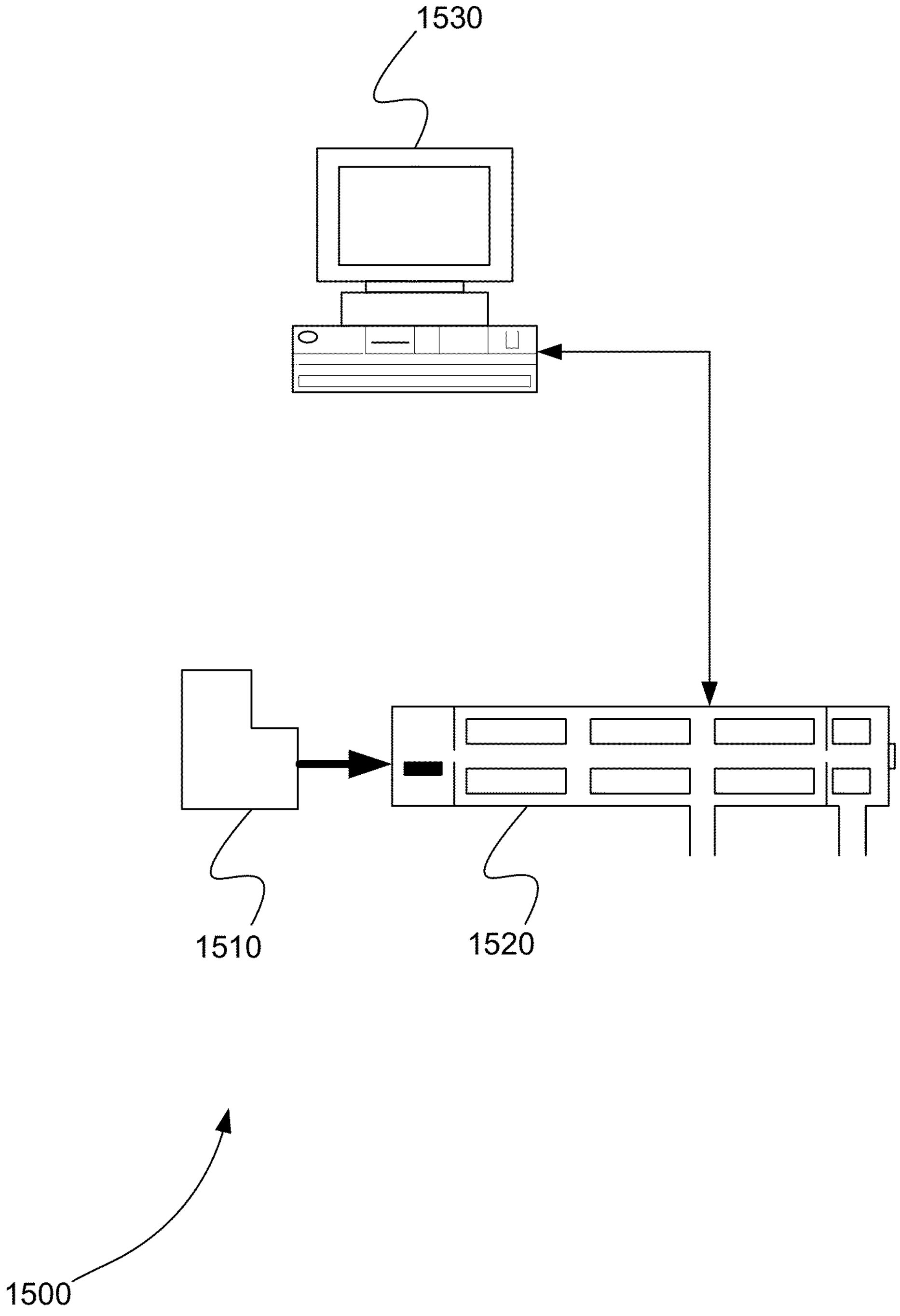
FIG. 15 is a schematic diagram showing a system for generating a background noise estimate for a collection of mass spectra produced by separation coupled mass spectrometry, in accordance with various embodiments.

FIG. 15 is a schematic diagram showing a system 1500 for generating a background noise estimate for a collection of mass spectra produced by separation coupled mass spectrometry, in accordance with various embodiments. System 1500 includes separation device 1510, mass spectrometer 1520, and processor 1530. Separation device 1510 separates one or more compounds from a sample mixture. Separation device 1510 can include, but is not limited to, an electrophoretic device, a chromatographic device, or a mobility device.

Mass spectrometer 1520 is a tandem mass spectrometer, for example. Mass spectrometer 1520 can include one or more physical mass analyzers that perform two or more mass analyses. A mass analyzer of a tandem mass spectrometer can include, but is not limited to, a time-of-flight (TOF), quadrupole, an ion trap, a linear ion trap, an orbitrap, a magnetic four-sector mass analyzer, a hybrid quadrupole time-of-flight (Q-TOF) mass analyzer, or a Fourier transform mass analyzer. Mass spectrometer 1520 can include separate mass spectrometry stages or steps in space or time, respectively. Mass spectrometer 1520 scans the separating sample at a plurality of time intervals producing a collection of mass spectra.

Processor 1530 is in communication with tandem mass spectrometer 1520. Processor 1530 can also be in communication with separation device 1510. Processor 1530 can be, but is not limited to, a computer, microprocessor, or any device capable of sending and receiving control signals and data to and from tandem mass spectrometer 1520 and processing data.

Processor 1530 obtains the collection of mass spectra. Processor 1530 can obtain the collection of mass spectra directly from mass spectrometer 1520, or it can get the collection of mass spectra from a file stored in a memory by mass spectrometer 1520, for example.

Processor 1530 divides the collection of mass spectra into two or more time interval window widths. For each window width of the two or more time interval window widths, processor 1530 sums all spectra within each window width producing a summed spectrum for each of the two or more time interval window widths. For each summed spectrum of the two or more time interval window widths, processor 1530 (a) estimates a noise spectrum corresponding to background noise in each summed spectrum, and (b) repeats step (a) one or more additional times to generate a modified noise spectrum for each summed spectrum.

In various embodiments, processor 1530 further subtracts each modified noise spectrum for each summed spectrum from each summed spectrum, generating a filtered spectrum for each of the two or more time interval window widths. Processor 1530 assembles the plurality of filtered spectra of the two or more time interval window widths into a single spectrum for the plurality of time intervals.

In various embodiments, processor 1530 subtracts each modified noise spectrum for each summed spectrum from each spectra of the summed spectrum, generating a collection of filtered spectra. Each filtered spectrum of the collection of filtered spectra corresponds to a spectrum of the collection of mass spectra, for example.

In various embodiments, processor 1530 estimates the noise spectrum corresponding to background noise in each summed spectrum by performing a number of steps. In step (A), processor 1530 affects a transformation of each summed spectrum into the frequency domain to obtain an original frequency spectrum. In step (B), processor 1530 identifies at least one dominant frequency in the original frequency spectrum. In step (C), processor 1530 generates a noise frequency spectrum by selectively filtering for said at least one dominant frequency. In step (D), processor 1530 determines the modified noise spectrum by affecting a transformation of the noise frequency spectrum into the mass domain.

In various embodiments, each summed spectrum includes a plurality of original intensity data points and wherein the modified noise spectrum includes a plurality of noise intensity data points such that each noise intensity data point correlates to an original intensity data point. Processor 1530 then estimates the noise spectrum corresponding to background noise in each summed spectrum by performing the following additional steps. In step (E), for each correlated pair of original and noise intensity data points processor 1530: (i) determines the minimum value; and (ii) modifies the modified noise spectrum by making the noise intensity data point equal to the minimum value. In step (F), processor 1530 affects a transformation of the modified noise spectrum modified in step (E) into the frequency domain to obtain a noise frequency spectrum. In step (G), processor 1530 identifies at least one dominant frequency in the noise frequency spectrum. In step (H), processor 1530 modifies the noise frequency spectrum by selectively filtering for said at least one dominant frequency. In step (I), processor 1530 determines the modified noise spectrum by affecting a transformation of the noise frequency spectrum into the mass domain.

In various embodiments, additional steps involve repeating previous steps. In step (J), processor 1530 repeats step (E) utilizing the modified noise spectrum determined in step (I). In step (K), processor 1530 repeats steps (F) through (J) inclusively.

In various embodiments, processor 1530 segments each summed spectrum into a plurality of initial windows prior to step (A), and separately affects steps (A) through (D) inclusive for each initial window.

In various embodiments, processor 1530 segments the modified noise spectrum into a plurality of subsequent windows prior to step (F), and separately affects steps (F) through (I) inclusive for each subsequent window. In various embodiments, the subsequent windows are configured such that no subsequent window is coextensive with any initial window.

In various embodiments, for each repeat of steps (G) through (J), processor 1530 segments the modified noise spectrum into a plurality of new windows prior to step (G), and separately affects steps (G) through (J) inclusive for each new window. The new windows are configured such that no new window is coextensive with any subsequent window.

Separation Coupled Mass Spectrometry Methods

Figure 16:
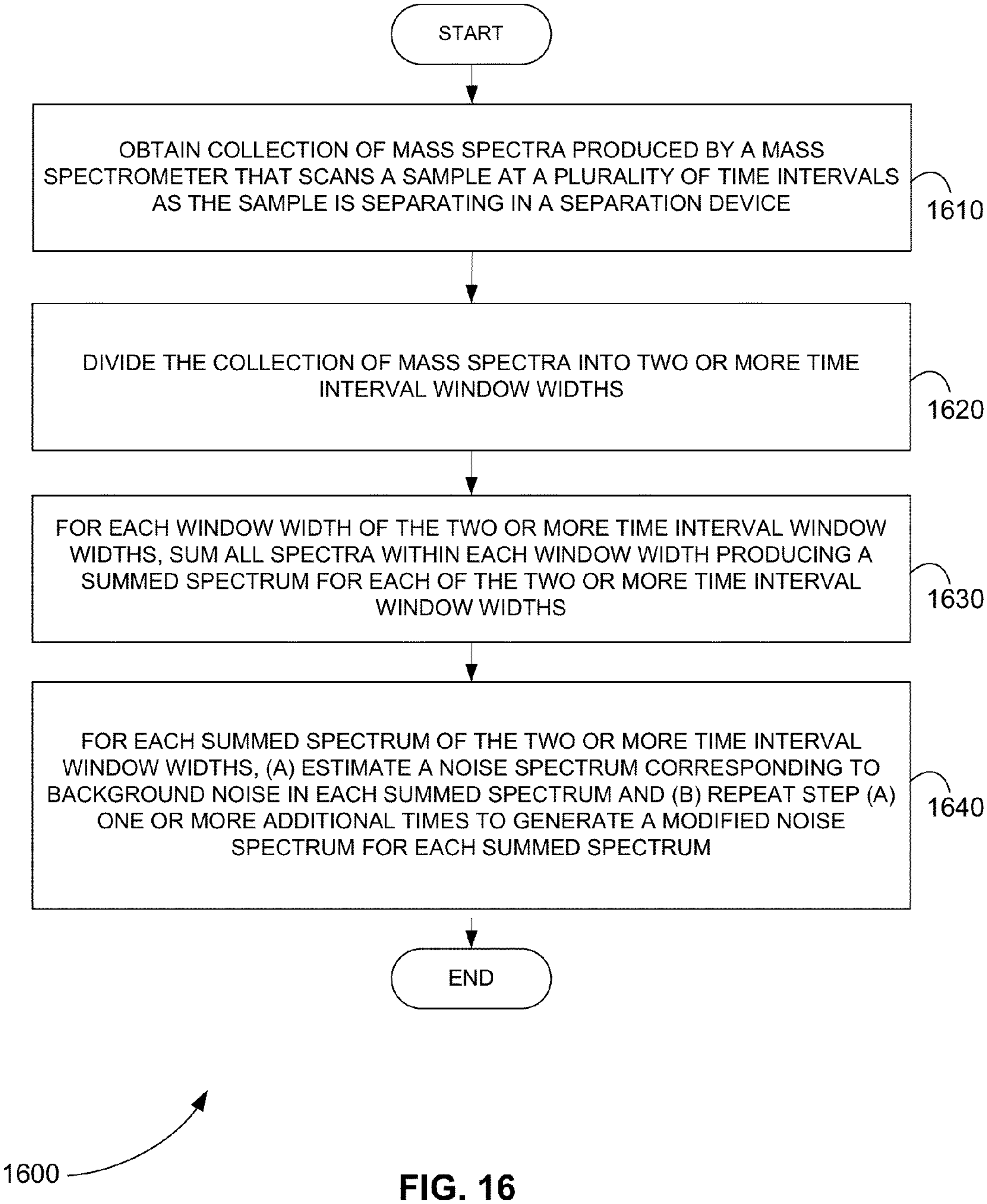
FIG. 16 is an exemplary flowchart showing a method for generating a background noise estimate for a collection of mass spectra produced by separation coupled mass spectrometry, in accordance with various embodiments.

FIG. 16 is an exemplary flowchart showing a method 1600 for generating a background noise estimate for a collection of mass spectra produced by separation coupled mass spectrometry, in accordance with various embodiments.

In step 1610 of method 1600, a collection of mass spectra produced by a mass spectrometer that scans a sample at a plurality of time intervals as the sample is separating in a separation device is obtained.

In step 1620, the collection of mass spectra is divided into two or more time interval window widths.

In step 1630, for each window width of the two or more time interval window widths, all spectra within each window are summed. A summed spectrum for each of the two or more time interval window widths is produced.

In step 1640, for each summed spectrum of the two or more time interval window widths, (a) a noise spectrum corresponding to background noise in each summed spectrum is estimated and (b) step (a) is repeated one or more additional times to generate a modified noise spectrum for each summed spectrum.

Separation Coupled Mass Spectrometry Computer Program Products

In various embodiments, a computer program product includes a non-transitory and tangible computer-readable storage medium whose contents include a program with instructions being executed on a processor so as to perform a method for generating a background noise estimate for a collection of mass spectra produced by separation coupled mass spectrometer. This method is performed by a system that includes one or more distinct software modules.

Figure 17:
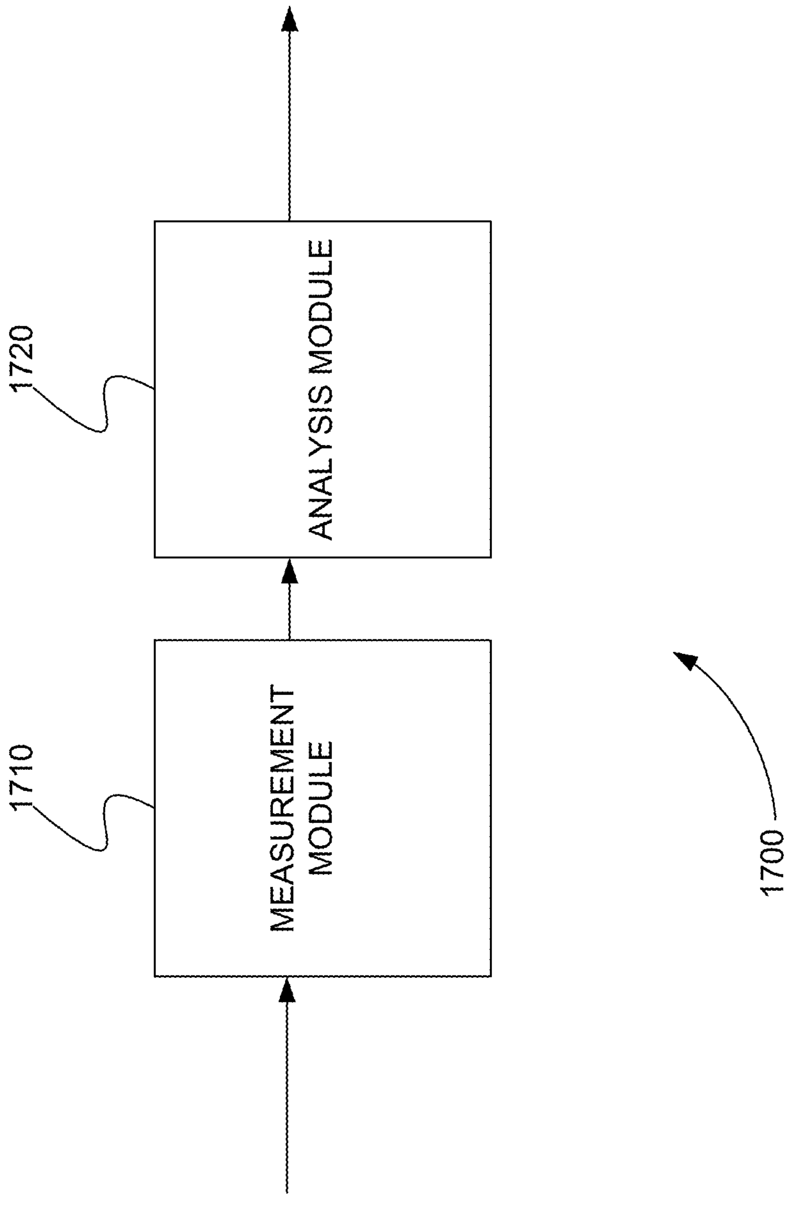
FIG. 17 is a schematic diagram of a system 1700 includes one or more distinct software modules that perform a method for generating a background noise estimate for a collection of mass spectra produced by separation coupled mass spectrometry, in accordance with various embodiments.

FIG. 17 is a schematic diagram of a system 1700 that includes one or more distinct software modules that perform a method for generating a background noise estimate for a collection of mass spectra produced by separation coupled mass spectrometry, in accordance with various embodiments. System 1700 includes measurement module 1710 and analysis module 1720.

Measurement module 1710 obtains a collection of mass spectra produced by a mass spectrometer that scans a sample at a plurality of time intervals as the sample is separating in a separation device.

Analysis module 1720 divides the collection of mass spectra into two or more time interval window widths. For each window width of the two or more time interval window widths, analysis module 1720 sums all spectra within each window. A summed spectrum for each of the two or more time interval window widths is produced. For each summed spectrum of the two or more time interval window widths, analysis module 1720 (a) estimates a noise spectrum corresponding to background noise in each summed spectrum and (b) repeats step (a) one or more additional times to generate a modified noise spectrum for each summed spectrum.

Filtered Data Mass Spectrometry Systems

Figure 18:
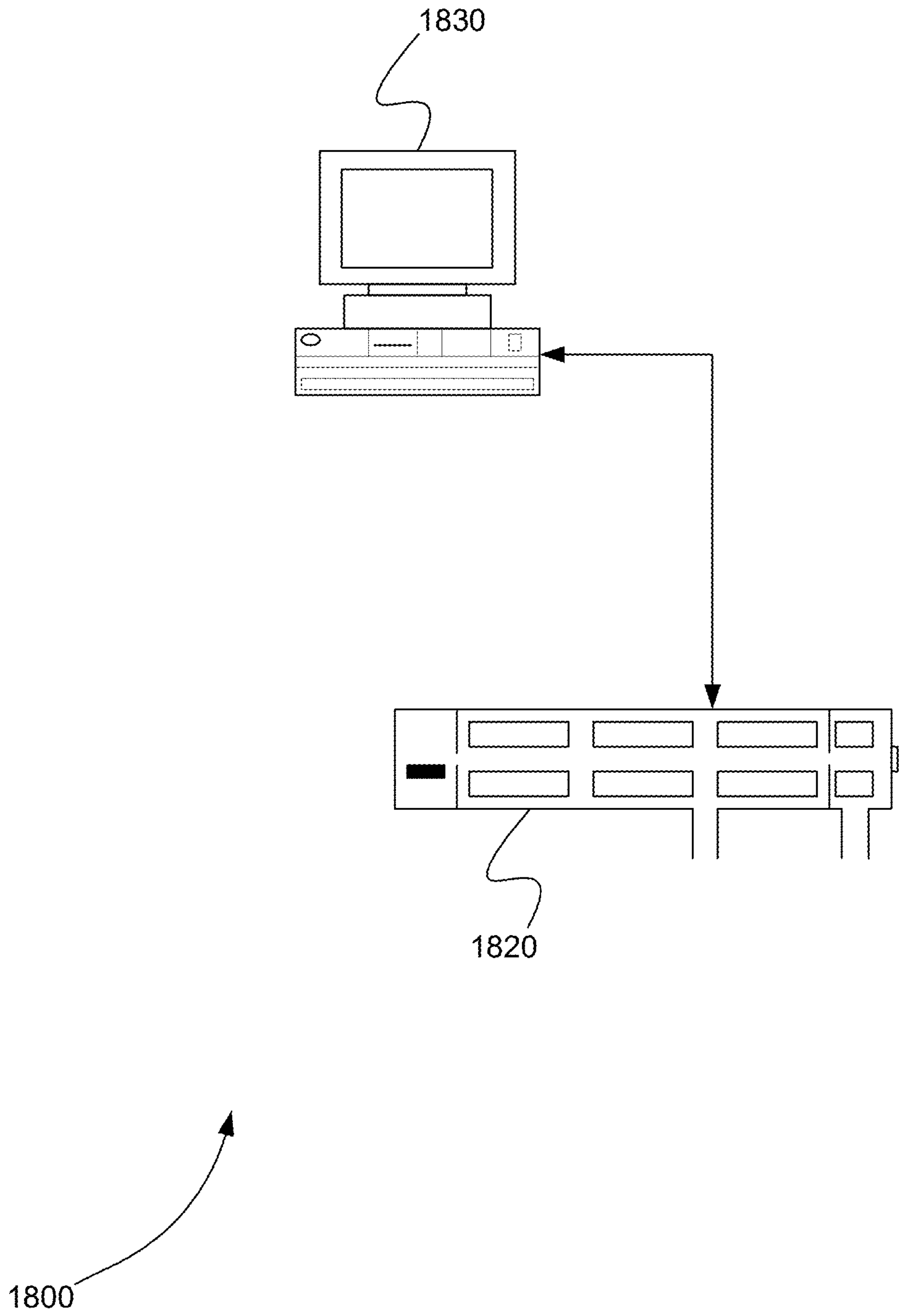
FIG. 18 is a schematic diagram showing a system for quantitatively or qualitatively analyzing a sample based on filtered mass spectrometry data, in accordance with various embodiments.

FIG. 18 is a schematic diagram showing a system 1800 for quantitatively or qualitatively analyzing a sample based on filtered mass spectrometry data, in accordance with various embodiments. System 1800 includes mass spectrometer 1820, and processor 1830.

Mass spectrometer 1820 is a tandem mass spectrometer, for example. Mass spectrometer 1820 can include one or more physical mass analyzers that perform two or more mass analyses. A mass analyzer of a tandem mass spectrometer can include, but is not limited to, a time-of-flight (TOF), quadrupole, an ion trap, a linear ion trap, an orbitrap, a magnetic four-sector mass analyzer, a hybrid quadrupole time-of-flight (Q-TOF) mass analyzer, or a Fourier transform mass analyzer. Mass spectrometer 1820 can include separate mass spectrometry stages or steps in space or time, respectively. Mass spectrometer 1820 performs a plurality of scans of a sample, producing a plurality of mass spectra.

Processor 1830 is in communication with tandem mass spectrometer 1820. Processor 1830 can be, but is not limited to, a computer, microprocessor, or any device capable of sending and receiving control signals and data to and from mass spectrometer 1820 and processing data.

Processor 1830 obtains the plurality of mass spectra. Processor 1830 can obtain the plurality of mass spectra directly from mass spectrometer 1820, or it can get the plurality of mass spectra from a file stored in a memory by mass spectrometer 1820, for example.

Processor 1830 combines neighboring mass spectra of the plurality of mass spectra into a collection of mass spectra based on sample location, time, or mass. Neighboring mass spectra from an imaging experiment can be combined into a collection of mass spectra based on sample location, for example. Neighboring mass spectra from a separation or infusion experiment can be combined into a collection of mass spectra based on time, for example. Neighboring mass spectra from a tandem mass spectrometry experiment can be combined into a collection of mass spectra based on precursor mass, for example.

Processor 1830 calculates a background noise estimate for the collection of mass spectra. Processor 1830 filters the collection of mass spectra using the background noise estimate, producing a filtered collection of one or more mass spectra.

Finally, processor 1830 performs quantitative or qualitative analysis using the filtered collection of one or more mass spectra. Processor 1830 performs quantitative analysis by generating liquid chromatography (LC) peak areas using the filtered collection of one or more mass spectra from a complete LCMS run, for example. Processor 1830 performs qualitative analysis (library search, library creation, database search, elemental composition calculation, etc.) by using filtered collection of one or more mass spectra to provide spectral peak assignment (mass and intensity), for example.

In various embodiments, system 1800 further includes a separation device that separates one or more compounds of the sample. Mass spectrometer 1820 performs a plurality of scans of the separating sample, producing a plurality of mass spectra scans at different times. Processor 1830 combines neighboring mass spectra of the plurality of mass spectra into a collection of mass spectra based on time.

In various embodiments, processor combines neighboring mass spectra of the plurality of mass spectra into a collection of mass spectra based on sample location, time, or mass by combining neighboring precursor ion spectra. In other words, neighboring mass spectrometry (MS) spectra are combined using full scans or narrow windows.

In various embodiments, processor 1830 combines neighboring mass spectra of the plurality of mass spectra into a collection of mass spectra based on sample location, time, or mass by combining neighboring product ion spectra. In other words, neighboring mass spectrometry/mass spectrometry (MSMS) spectra are combined. For example, neighboring MSMS spectra are combined from the same precursor ion using full scans or narrow windows. Alternatively, neighboring MSMS spectra are combined from different precursor ions using full scans.

In various embodiments, a background noise estimate is generated when only a single data point is measured.

In various embodiments, processor 1830 calculates a background noise estimate for the collection of mass spectra using time-frequency analysis.

In various embodiments, processor 1830 divides the collection of mass spectra into two or more windows. The collection of mass spectra are divided into two or more windows based on sample location, time, or mass, for example. For each window of the two or more windows, processor 1830 combines all spectra within each window producing a combined spectrum for each of the two or more windows. Processor 1830 combines all spectra within each window by summing all spectra, for example. For each combined spectrum of the two or more windows, processor 1830 (a) estimates a noise spectrum corresponding to background noise in each combined spectrum, and (b) repeats step (a) one or more additional times to generate a modified noise spectrum for each combined spectrum.

In various embodiments, processor 1830 further subtracts each modified noise spectrum for each combined spectrum from each combined spectrum, generating a filtered spectrum for each of the two or more windows. Processor 1830 assembles the plurality of filtered spectra of the two or more windows into a single spectrum for the plurality of time intervals.

In various embodiments, processor 1830 subtracts each modified noise spectrum for each combined spectrum from each spectra of the combined spectrum, generating a collection of filtered spectra. Each filtered spectrum of the collection of filtered spectra corresponds to a spectrum of the collection of mass spectra, for example.

In various embodiments, processor 1830 estimates the noise spectrum corresponding to background noise in each combined spectrum by performing a number of steps. In step (A), processor 1830 affects a transformation of each combined spectrum into the frequency domain to obtain an original frequency spectrum. In step (B), processor 1830 identifies at least one dominant frequency in the original frequency spectrum. In step (C), processor 1830 generates a noise frequency spectrum by selectively filtering for said at least one dominant frequency. In step (D), processor 1830 determines the modified noise spectrum by affecting a transformation of the noise frequency spectrum into the mass domain.

In various embodiments, each combined spectrum includes a plurality of original intensity data points and wherein the modified noise spectrum includes a plurality of noise intensity data points such that each noise intensity data point correlates to an original intensity data point. Processor 1830 then estimates the noise spectrum corresponding to background noise in each combined spectrum by performing the following additional steps. In step (E), for each correlated pair of original and noise intensity data points processor 1830: (i) determines the minimum value; and (ii) modifies the modified noise spectrum by making the noise intensity data point equal to the minimum value. In step (F), processor 1830 affects a transformation of the modified noise spectrum modified in step (E) into the frequency domain to obtain a noise frequency spectrum. In step (G), processor 1830 identifies at least one dominant frequency in the noise frequency spectrum. In step (H), processor 1830 modifies the noise frequency spectrum by selectively filtering for said at least one dominant frequency. In step (I), processor 1830 determines the modified noise spectrum by affecting a transformation of the noise frequency spectrum into the mass domain.

In various embodiments, additional steps involve repeating previous steps. In step (J), processor 1830 repeats step (E)

utilizing the modified noise spectrum determined in step (I). In step (K), processor 1830 repeats steps (F) through (J) inclusively.

In various embodiments, processor 1830 segments each combined spectrum into a plurality of initial windows prior to step (A), and separately affects steps (A) through (D) inclusive for each initial window.

In various embodiments, processor 1830 segments the modified noise spectrum into a plurality of subsequent windows prior to step (F), and separately affects steps (F) through (I) inclusive for each subsequent window. In various embodiments, the subsequent windows are configured such that no subsequent window is coextensive with any initial window.

In various embodiments, for each repeat of steps (G) through (J), processor 1830 segments the modified noise spectrum into a plurality of new windows prior to step (G), and separately affects steps (G) through (J) inclusive for each new window. The new windows are configured such that no new window is coextensive with any subsequent window.

Filtered Data Mass Spectrometry Methods

Figure 19:
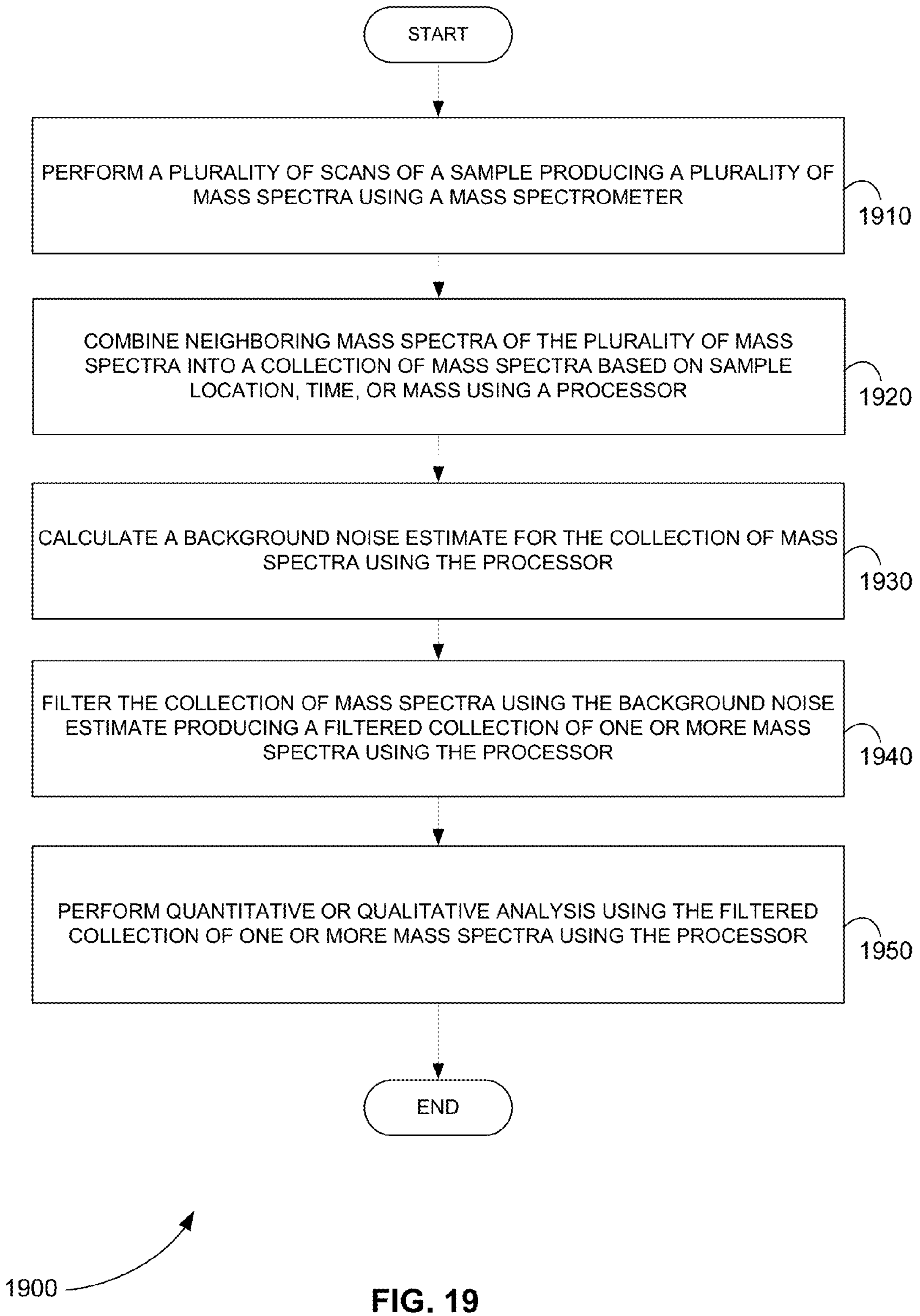
FIG. 19 is an exemplary flowchart showing a method for quantitatively or qualitatively analyzing a sample based on filtered mass spectrometry data, in accordance with various embodiments.

FIG. 19 is an exemplary flowchart showing a method 1900 for quantitatively or qualitatively analyzing a sample based on filtered mass spectrometry data, in accordance with various embodiments.

In step 1910 of method 1900, a plurality of scans of a sample are performed, producing a plurality of mass spectra using a mass spectrometer.

In step 1920, neighboring mass spectra of the plurality of mass spectra are combined into a collection of mass spectra based on sample location, time, or mass using a processor.

In step 1930, a background noise estimate is calculated for the collection of mass spectra using the processor.

In step 1940, the collection of mass spectra is filtered using the background noise estimate, producing a filtered collection of one or more mass spectra using the processor.

In step 1950, quantitative or qualitative analysis is performed using the filtered collection of one or more mass spectra using the processor.

Filtered Data Mass Spectrometry Computer Program Products

In various embodiments, a computer program product includes a non-transitory and tangible computer-readable storage medium whose contents include a program with instructions being executed on a processor so as to perform a method for quantitatively or qualitatively analyzing a sample based on filtered mass spectrometry data. This method is performed by a system that includes one or more distinct software modules.

Figure 20:
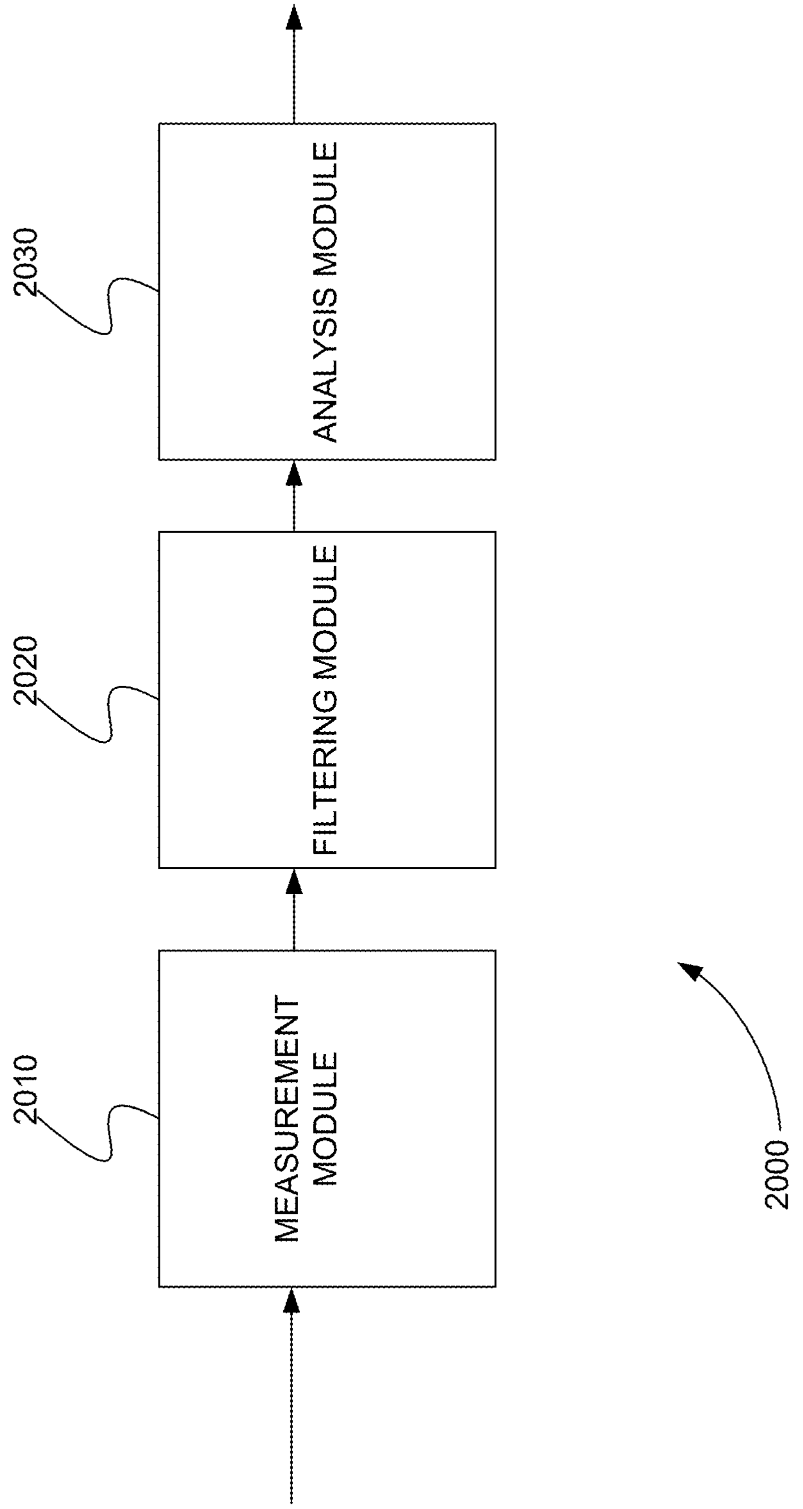
FIG. 20 is a schematic diagram of a system that includes one or more distinct software modules that perform a method for generating a background noise estimate for quantitatively or qualitatively analyzing a sample based on filtered mass spectrometry data, in accordance with various embodiments.

FIG. 20 is a schematic diagram of a system 2000 that includes one or more distinct software modules that perform a method for generating a background noise estimate for quantitatively or qualitatively analyzing a sample based on filtered mass spectrometry data, in accordance with various embodiments. System 2000 includes measurement module 2010, filtering module 2020, and analysis module 2030.

Measurement module 2010 receives a plurality of mass spectra produced by a mass spectrometer that performs a plurality of scans of a sample. Filtering module 2020 calculates a background noise estimate for the collection of mass spectra. Filtering module 2020 filters the collection of mass spectra using the background noise estimate, producing a filtered collection of one or more mass spectra. Analysis module 2030 performs quantitative or qualitative analysis using the filtered collection of one or more mass spectra.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for quantitatively or qualitatively analyzing a sample based on filtered mass spectrometry data, comprising:

a mass spectrometer that performs a plurality of scans of a sample, producing a plurality of mass spectra; and a processor that combines neighboring mass spectra of the plurality of mass spectra into a collection of mass spectra based on sample location, time, or mass, calculates a background noise estimate for the collection of mass spectra, filters the collection of mass spectra using the background noise estimate, producing a filtered collection of one or more mass spectra, and performs quantitative or qualitative analysis using the filtered collection of one or more mass spectra.

2. The system of claim 1, further comprising a separation device that separates one or more compounds of the sample, wherein the mass spectrometer performs a plurality of scans of the separating sample, producing a plurality of mass spectra scans at different times and wherein the processor combines neighboring mass spectra of the plurality of mass spectra into a collection of mass spectra based on time.

3. The system of claim 1, wherein the processor combines neighboring mass spectra of the plurality of mass spectra into a collection of mass spectra based on sample location, time, or mass by combining neighboring precursor ion spectra.

4. The system of claim 1, wherein the processor combines neighboring mass spectra of the plurality of mass spectra into a collection of mass spectra based on sample location, time, or mass by combining neighboring product ion spectra.

5. The system of claim 4, wherein combining neighboring product ion spectra comprises combining neighboring product ion spectra from a same precursor ion.

6. The system of claim 4, wherein combining neighboring product ion spectra comprises combining neighboring product ion spectra from at least two or more different precursor ions.

7. The system of claim 1, wherein the processor calculates a background noise estimate for the collection of mass spectra using time-frequency analysis.

8. The system of claim 1, wherein the processor calculates a background noise estimate for the collection of mass spectra by dividing the collection of mass spectra into two or more windows of mass spectra, for each window of the two or more windows, combining all spectra within each window producing a combined spectrum for each of the two or more windows, and for each combined spectrum of the two or more windows (a) estimating a noise spectrum corresponding to background noise in the each combined spectrum and (b) repeating step (a) one or more additional times to generate a modified noise spectrum for the each combined spectrum.

9. The system of claim 8, wherein the processor filters the collection of mass spectra using the background noise estimate by subtracting each modified noise spectrum for the each combined spectrum from the each combined spectrum, generating a filtered spectrum for each of the two or more windows and assembling the plurality of filtered spectra of the two or more windows into a single spectrum for the plurality of intervals.

10. The system of claim 8, wherein the processor filters the collection of mass spectra using the background noise estimate by subtracting each modified noise spectrum for the each combined spectrum from each spectrum of the combined spectrum, generating a collection of filtered spectra, wherein each filtered spectrum of the collection of filtered spectra corresponds to a spectrum of the collection of mass spectra.

11. The system of claim 8, wherein the processor calculates a background noise estimate for the collection of mass spectra by calculating an adjusted background noise estimate for each scan of the plurality of scans from a moving average of modified noise spectra from the two or more windows.

12. The system of claim 8, wherein the processor calculates a background noise estimate for the collection of mass spectra by calculating an adjusted background noise estimate for each scan of the plurality of scans from an interpolation of modified noise spectra from the two or more windows.

13. The system of claim 8, wherein step (a) comprises the steps of:

A) affecting a transformation of the each combined spectrum into the frequency domain to obtain an original frequency spectrum;

B) identifying at least one dominant frequency in the original frequency spectrum;

C) generating a noise frequency spectrum by selectively filtering for said at least one dominant frequency; and D) determining the modified noise spectrum by affecting a transformation of the noise frequency spectrum into the mass domain.

14. The system of claim 13, wherein the each combined spectrum comprises a plurality of original intensity data points and wherein the modified noise spectrum comprises a plurality of noise intensity data points such that each noise intensity data point correlates to an original intensity data point, step (a) of the method further comprising the following step:

E) for each correlated pair of original and noise intensity data points: (i) determining the minimum value; and (ii) modifying the modified noise spectrum by making the noise intensity data point equal to the minimum value.

15. The system of claim 14, step (a) further comprising the following steps:

F) affecting a transformation of the modified noise spectrum modified in step (E) into the frequency domain to obtain a noise frequency spectrum;

G) identifying at least one dominant frequency in the noise frequency spectrum;

H) modifying the noise frequency spectrum by selectively filtering for said at least one dominant frequency; and I) determining the modified noise spectrum by affecting a transformation of the noise frequency spectrum into the mass domain.

16. The system of claim 15, step (b) further comprising the following step:

J) repeating step (E) utilizing the modified noise spectrum determined in step (I).

17. The system of claim 16, further comprising repeating steps (F) through (J) inclusively.

18. The system of claim 17, further comprising the step of segmenting the each combined spectrum into a plurality of initial windows prior to step A, and separately affecting steps A through D inclusive for each initial window.

19. The system of claims claim 18, further comprises the step of segmenting the modified noise spectrum into a plurality of subsequent windows prior to step F, and separately affecting steps F through I inclusive for each subsequent window.

20. The system of claim 19, wherein the subsequent windows are configured such that no subsequent window is coextensive with any initial window.

21. The system of claim 20, further comprising the step of subsequent to step J, for each repeat of steps G through J, segmenting the modified noise spectrum into a plurality of new windows prior to step G, and separately affecting steps G through J inclusive for each new window, and wherein the new windows are configured such that no new window is coextensive with any subsequent window.

22. A method for quantitatively or qualitatively analyzing a sample based on filtered mass spectrometry data, comprising:

performing a plurality of scans of a sample, producing a plurality of mass spectra using a mass spectrometer;

combining neighboring mass spectra of the plurality of mass spectra into a collection of mass spectra based on sample location, time, or mass using a processor;

calculating a background noise estimate for the collection of mass spectra using the processor;

filtering the collection of mass spectra using the background noise estimate, producing a filtered collection of one or more mass spectra using the processor, and performing quantitative or qualitative analysis using the filtered collection of one or more mass spectra using the processor.

23. A computer program product, comprising a non-transitory and tangible computer-readable storage medium whose contents include a program with instructions being executed on a processor so as to perform a method for quantitatively or qualitatively analyzing a sample based on filtered mass spectrometry data, the method comprising:

providing a system, wherein the system comprises one or more distinct software modules, and wherein the distinct software modules comprise a measurement module, a filtering module, and an analysis module;

receiving a plurality of mass spectra produced by a mass spectrometer that performs a plurality of scans of a sample using the measurement module;

calculating a background noise estimate for the collection of mass spectra using the filtering module;

filtering the collection of mass spectra using the background noise estimate, producing a filtered collection of one or more mass spectra using the filtering module, and performing quantitative or qualitative analysis using the filtered collection of one or more mass spectra using the analysis module.

* * * * *